United States Patent
Miyama et al.

(10) Patent No.: US 12,199,479 B2
(45) Date of Patent: Jan. 14, 2025

(54) ELECTROMAGNETIC DEVICE HAVING STATOR CORE FORMED WITH STACKED THIN SHEETS AND AIRCRAFT IN WHICH ELECTROMAGNETIC DEVICE IS USED

(71) Applicant: Mitsubishi Electric Corporation, Tokyo (JP)

(72) Inventors: Yoshihiro Miyama, Tokyo (JP); Hiroshi Mitsuda, Tokyo (JP); Kazumasa Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 239 days.

(21) Appl. No.: 17/917,261

(22) PCT Filed: Jan. 21, 2021

(86) PCT No.: PCT/JP2021/002029
§ 371 (c)(1),
(2) Date: Oct. 6, 2022

(87) PCT Pub. No.: WO2021/240870
PCT Pub. Date: Dec. 2, 2021

(65) Prior Publication Data
US 2023/0163670 A1 May 25, 2023

(30) Foreign Application Priority Data
May 29, 2020 (JP) .................. 2020-094053

(51) Int. Cl.
*H02K 16/02* (2006.01)
*B64D 27/24* (2006.01)
(Continued)

(52) U.S. Cl.
CPC ............. *H02K 16/02* (2013.01); *B64D 27/24* (2013.01); *H02K 1/12* (2013.01); *H02K 1/22* (2013.01); *H02K 7/003* (2013.01)

(58) Field of Classification Search
CPC ........... H02K 1/12; H02K 1/22; H02K 7/003; H02K 16/02; B64D 27/24
(Continued)

(56) References Cited

U.S. PATENT DOCUMENTS 11,476,741 B2 * 10/2022 Hattori ................. H02K 21/046
2018/0233997 A1 * 8/2018 Takahashi ............... H02K 1/02
(Continued)

FOREIGN PATENT DOCUMENTS

| JP | 2010-16932 A | 1/2010 |
| JP | 2018-85886 A | 5/2018 |
| JP | 2019-37084 A | 3/2019 |

OTHER PUBLICATIONS

International Search Report and Written Opinion mailed on Mar. 30, 2021, received for PCT Application PCT/JP2021/002029, filed on Jan. 21, 2021, 8 pages including English Translation.

*Primary Examiner* — Rashad H Johnson
(74) *Attorney, Agent, or Firm* — XSENSUS LLP

(57) ABSTRACT

This electromagnetic device includes: two movable parts movable in parallel or antiparallel to each other; and a stator core arranged with two surfaces thereof respectively opposed to the two movable parts. At least part of the stator core is formed by stacking thin sheets in a movable direction of the movable parts and is retained with tensile stress applied thereto in a direction parallel to the two surfaces opposed to the movable parts and perpendicular to the movable direction of the movable parts.

19 Claims, 20 Drawing Sheets

(51) Int. Cl.
*H02K 1/12* (2006.01)
*H02K 1/22* (2006.01)
*H02K 7/00* (2006.01)

(58) Field of Classification Search
USPC .................................................. 310/216.001
See application file for complete search history.

(56) References Cited

U.S. PATENT DOCUMENTS

| | | | |
|---|---|---|---|
| 2018/0337572 A1* | 11/2018 | Miyama | ................. H02K 5/203 |
| 2019/0013705 A1* | 1/2019 | Honda | ................. H02K 15/022 |
| 2021/0336494 A1* | 10/2021 | Suehiro | ................. H02K 3/28 |
| 2023/0123457 A1* | 4/2023 | Miyama | ................. H02K 3/28 |
| | | | 310/61 |
| 2023/0163669 A1* | 5/2023 | Miyama | ................. H02K 21/14 |
| | | | 310/114 |
| 2024/0055920 A1* | 2/2024 | Mitsuda | ............... H02K 1/2791 |
| 2024/0072594 A1* | 2/2024 | Hamada | ............... H02K 3/493 |
| 2024/0120780 A1* | 4/2024 | Kondo | ................. H02K 1/276 |

* cited by examiner

ELECTROMAGNETIC DEVICE HAVING STATOR CORE FORMED WITH STACKED THIN SHEETS AND AIRCRAFT IN WHICH ELECTROMAGNETIC DEVICE IS USED

CROSS-REFERENCE TO RELATED APPLICATIONS

The present application is based on PCT filing PCT/JP2021/002029, filed Jan. 21, 2021, which claims priority to JP 2020-094053, filed May 29, 2020, the entire contents of each are incorporated herein by reference. This application is also related to U.S. patent application Ser. No. 17/917,257, entitled ROTARY ELECTRIC MACHINE AND AIRCRAFT USING ROTARY ELECTRIC MACHINE, filed Oct. 6, 2022. The entire contents of each are incorporated herein by reference.

TECHNICAL FIELD

The present disclosure relates to an electromagnetic device and an aircraft using the electromagnetic device.

BACKGROUND ART

Conventionally, regarding a stator core surrounded by two opposed movable parts in a rotary electric machine which is an electromagnetic device, it is disclosed that the stator core is formed by stacking thin sheets in a direction parallel to two surfaces facing the movable parts which are rotors and perpendicular to the movable direction of the movable parts, and retention members are fitted to holes provided so as to penetrate in the stacking direction, thereby retaining the stator core (for example, Patent Document 1).

Also, it is disclosed that, in a rotary electric machine, a stator core is formed by stacking thin sheets in a direction parallel to the two opposed movable parts and substantially parallel to the movable direction of the movable parts, bolt holes for retaining the stacked sheets are provided in a direction parallel to two surfaces of the stator core facing the movable parts which are rotors and perpendicular to the movable direction of the movable parts, and bolts are fastened, thereby retaining the stator core (for example, Patent Document 2).

CITATION LIST

Patent Document

Patent Document 1: Japanese Laid-Open Patent Publication No. 2019-37084
Patent Document 1: Japanese Laid-Open Patent Publication No. 2018-85886

SUMMARY OF THE INVENTION

Problems to be Solved by the Invention

In Patent Document 1, an electromagnetic force due to operation of the rotary electric machine acts in a direction to cause shear between the stacked sheets of the stator core, and therefore the retention members are fitted to the holes penetrating in the stacking direction, so as to retain the stator core. Thus, the retention members interfere with a magnetic path of the stator core, leading to size increase of the device and reduction in efficiency.

On the other hand, in Patent Document 2, since the stator core needs to be retained by applying a clamping force in the stacking direction, the magnetic property of the stator core is deteriorated. In addition, also in another example in Patent Document 2, the stator core is pressed by fitting portions and thus the magnetic property is deteriorated.

The present disclosure has been made to solve the above problem, and an object of the present disclosure is to provide an electromagnetic device in which a stator core is retained without increasing the size of the device and without deteriorating the magnetic property, and an aircraft using the electromagnetic device.

Solution to the Problems

An electromagnetic device according to the present disclosure includes: two movable parts movable in parallel or antiparallel to each other; and a stator core arranged with two surfaces thereof respectively opposed to the two movable parts. At least part of the stator core is formed by stacking thin sheets in a movable direction of the movable parts and is retained with tensile stress applied thereto in a direction parallel to the two surfaces opposed to the two movable parts and perpendicular to the movable direction of the movable parts.

Effect of the Invention

In the electromagnetic device according to the present disclosure, since the stator core is retained with tensile stress applied thereto, it becomes possible to retain the stator core without increasing the size of the device and without deteriorating the magnetic property of the stator core.

BRIEF DESCRIPTION OF THE DRAWINGS

FIG. 1 is a perspective view showing a method for assembling the stator core of the rotary electric machine according to embodiment 4.

FIG. 21 is another schematic view showing another aircraft using an electromagnetic device according to embodiment 9.

DESCRIPTION OF EMBODIMENTS

Figure 1:
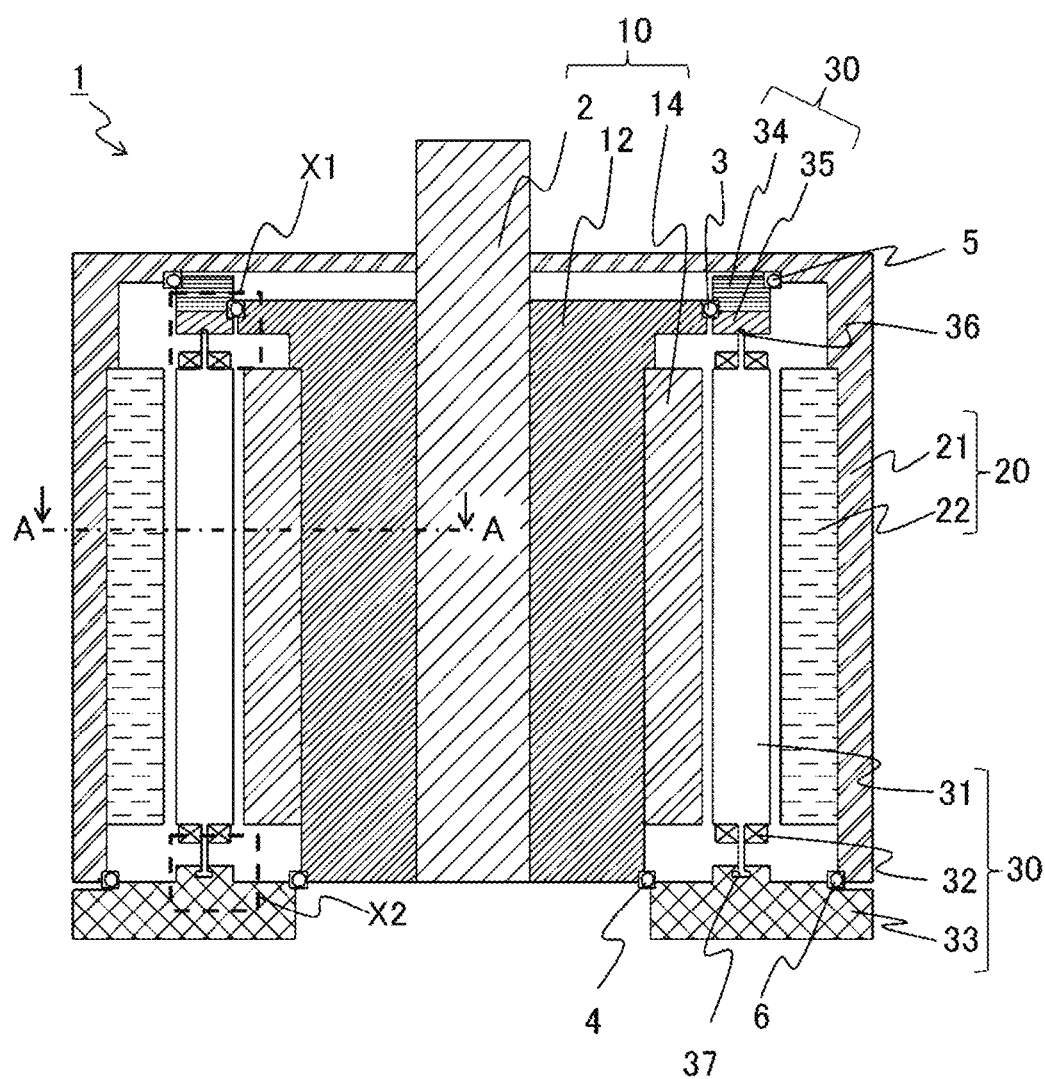
FIG. 1 is a sectional view along a rotary shaft of a rotary electric machine according to embodiment 1.

Hereinafter, embodiments will be described with reference to the drawings. The drawings are schematically shown and some configurations are omitted or simplified for convenience of description. The relationship of sizes and positions of components and the like shown in different drawings are not necessarily precisely shown, and may be changed as appropriate. In the following description, the same constituent elements are denoted and shown by the same reference characters, and also they are the same in names and functions. Therefore, the detailed description thereof may be omitted for avoiding redundant description.

In the embodiments, a rotary electric machine, a magnetic gear, and a linear motor are sequentially described as examples of an electromagnetic device, but the electromagnetic device is not limited thereto.

Embodiment 1

Hereinafter, a rotary electric machine as an electromagnetic device according to embodiment 1 will be described with reference to the drawings.

FIG. 1 is a sectional view along a rotary shaft, showing the structure of the rotary electric machine according to embodiment 1. In FIG. 1, a rotary electric machine 1 includes two rotors which are an inner rotor 10 and an outer rotor 20, and a stator 30 provided between the two rotors in the radial direction, and is formed as a radial gap motor of a double-rotor type.

The inner rotor 10 includes a shaft 2, a boss 12 press-fitted and fixed to the shaft 2, and a permanent magnet 14 adhered and fixed to the radially outer side of the boss 12.

The outer rotor 20 includes an outer shaft 21 fixed to the shaft 2, and a permanent magnet 22 adhered and fixed to the radially inner side of the outer shaft 21.

In the stator 30, a stator core 31 is provided in the axial direction between a load-side retention member 35 attached to a load-side base 34, and a non-load-side base 33, and a stator coil 32 is wound around the stator core 31. The stator 30, which is provided between the inner rotor 10 and the outer rotor 20, rotatably retains the inner rotor 10 and the outer rotor 20 by a load-side inner bearing 3, a load-side outer bearing 5, a non-load-side inner bearing 4, and a non-load-side outer bearing 6.

Figure 2:
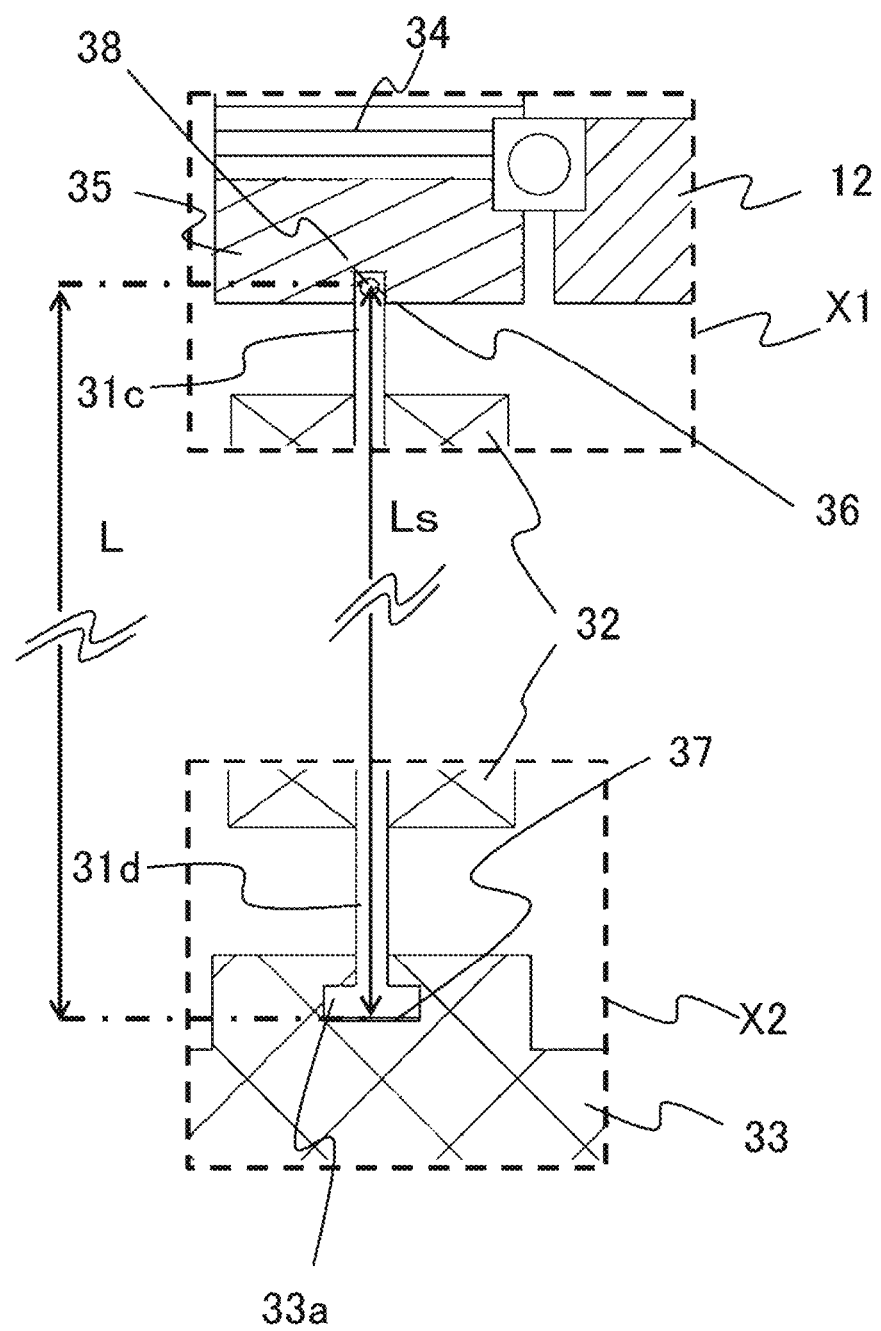
FIG. 2 is a sectional view along the rotary shaft of the rotary electric machine according to embodiment 1 and is a partial enlarged view of FIG. 1.

FIG. 2 is an enlarged view in areas X1 and X2 enclosed by broken lines in FIG. 1.

Of the stator core 31, both axial-direction ends near the radial-direction center extend in the axial direction and protrude from the wound stator coil 32 parts. One distal end portion 31c on the load side is fixed to the load-side retention member 35 by a bolt 38, and another distal end portion 31d on the fixed side is fixed by being caught in a T-shaped groove 33a provided in the non-load-side base 33. In the drawing, a position where the stator core 31 is fixed by the bolt 38 is defined as a load-side retention surface 36, and the bottom surface of the groove 33a where the stator core 31 is fixed in the T-shaped groove 33a is defined as a fixed-side retention surface 37. In this case, the natural length of a length Ls between the fixed part of the stator core 31 with the bolt 38 and the end fixed to the groove 33a is smaller than a length L between the load-side retention surface 36 and the fixed-side retention surface 37. Therefore, the stator core 31 is extended in the axial direction with tensile stress applied thereto.

Figure 3:
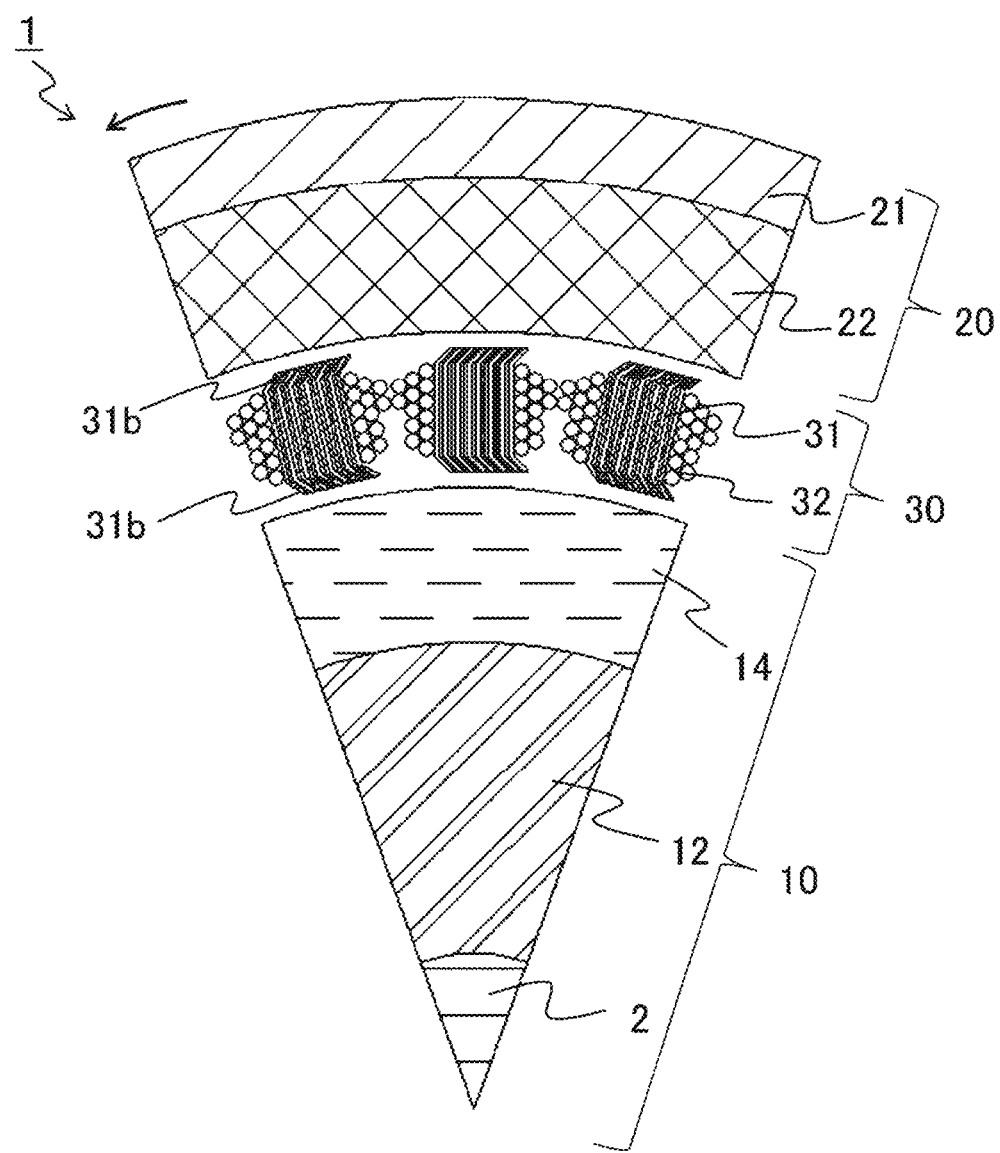
FIG. 3 is a partial sectional view along a direction perpendicular to the rotary shaft of the rotary electric machine according to embodiment 1.

FIG. 3 is a sectional view along a direction perpendicular to the rotary shaft of the rotary electric machine 1 and is a partial sectional view along an A-A line direction in FIG. 1. In the drawing, the rotary electric machine 1 has a concentrated-winding configuration with 48 poles and 72 slots. The stator core 31 is formed by stacking, substantially in the circumferential direction, thin steel sheets that are long in the axial direction. The inner rotor 10 and the outer rotor 20 rotate at the same angular velocity counterclockwise in the drawing. That is, the inner rotor 10 and the outer rotor 20 are movable parts.

Figure 4:
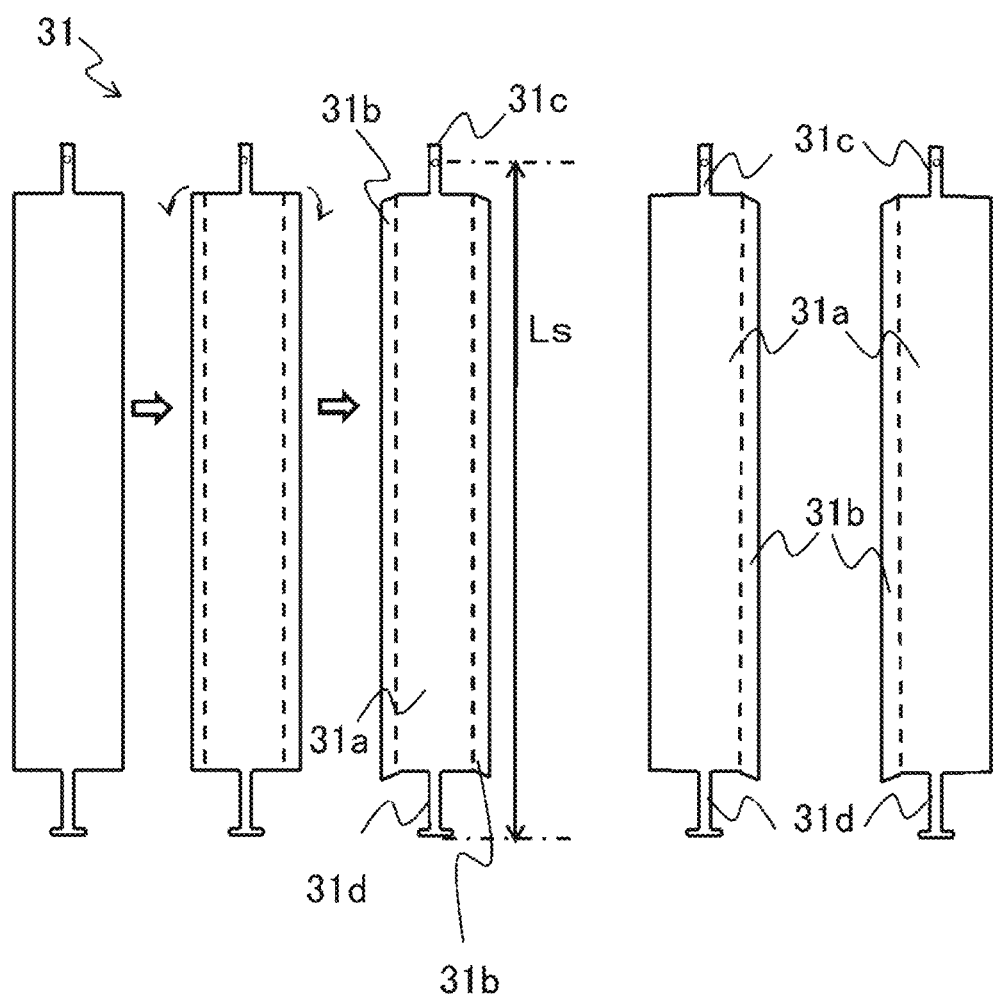
FIGS. 4A to 4C show shows the structure of a stator core of the rotary electric machine according to embodiment 1.

FIGS. 4A to 4C show shows the structure of the stator core 31. The stator core 31 is formed from thin steel sheets that are long in the axial direction and are each formed such that one axial-direction end protrudes from a body portion 31a so as to form the distal end portion 31c having a bolt fastening hole and another axial-direction end protrudes so as to form the distal end portion 31d having a T shape. In an order indicated by arrows in FIG. 4A, both side portions 31b along the axial direction are bent. Then, as shown in FIG. 3, the steel sheets are stacked in a state in which the respective side portions 31b of the stator core 31 opposed to the inner rotor 10 and the outer rotor 20 are bent toward the rotation-direction lagged side at an angle smaller than 90°. The thin steel sheets of the stator core 31 are electromagnetic steel sheets manufactured by rolling, and are arranged such that the rolling direction coincides with the radial direction of the stator core and a direction connecting the side portions 31b and also coincides with the opposing direction to the inner rotor 10 and the outer rotor. As shown in FIG. 1 and FIG. 2, the stator core 31 is attached such that the distal end portion 31d is fixed in the T-shaped groove 33a provided in the non-load-side base 33 and the distal end portion 31c is fixed by the bolt 38 with the stator core 31 pulled in the axial direction.

With the above structure, the stator core 31 is fixed with tensile stress applied thereto. Thus, magnetic property deterioration due to compressive stress does not occur and efficiency can be enhanced. In addition, since the radial-direction center parts of the stator core 31 are fixed, it is easy to apply tensile stress equally to the stator core 31 and thus efficiency can be easily enhanced.

Further, since the distal end portions 31c, 31d of the stator core 31 are thinner than the body portion 31a thereof, the axial-direction sectional areas of the distal end portions 31c, 31d are small, and the stator core 31 is fixed at positions protruding from the wound parts of the stator coil 32. Thus, the influence on the magnetic path is also small.

In addition, even if the load-side retention member 35 and the non-load-side base 33 are made of a magnetic material, as described above, since the distal end portions 31c, 31d of the stator core 31 are thinner than the body portion 31a thereof, the axial-direction sectional areas of the distal end portions 31c, 31d are small, and thus the influence on the magnetic path is also small. On the other hand, if the load-side retention member 35 and the non-load-side base 33 are made of a non-magnetic material, a closed magnetic path to the stator core 31 at each individual circumferential-direction part is not formed and thus the influence on the magnetic path can be eliminated.

In addition, since the side portions 31b along the axial direction of the stator core 31 are bent toward the rotation-direction lagged side, magnetic fluxes from the movable inner rotor 10 and outer rotor 20 can be readily collected to the stator core 31.

In the above structure of the stator core 31, at both side end portions along the axial direction, both side portions 31b on the inner rotor 10 side and the outer rotor 20 side are bent toward the rotation-direction lagged side. However, as shown in FIG. 4B and FIG. 4C, only one of the side portions 31b may be bent, whereby the same effects are obtained.

Both side portions 31b along the axial direction of the stator core 31 are bent at the same angle. However, the bending angles may be gradually increased toward the radial-direction lagged side. Thus, a larger amount of magnetic flux can be readily collected, whereby torque of the rotary electric machine 1 can be enhanced.

As described above, in the rotary electric machine according to embodiment 1, the stator 30 is provided between the inner rotor 10 and the outer rotor 20 which are movable with the shaft 2 as an axis, and the stator 30 includes the stator core 31 formed by stacking thin sheets in the rotation direction and is retained with tensile stress applied thereto in the axial direction, whereby the stator core 31 can be retained without deteriorating the magnetic property thereof. Thus, efficiency and torque of the rotary electric machine can be enhanced.

Embodiment 2

Hereinafter, a rotary electric machine as an electromagnetic device according to embodiment 2 will be described with reference to the drawings.

Figure 5:
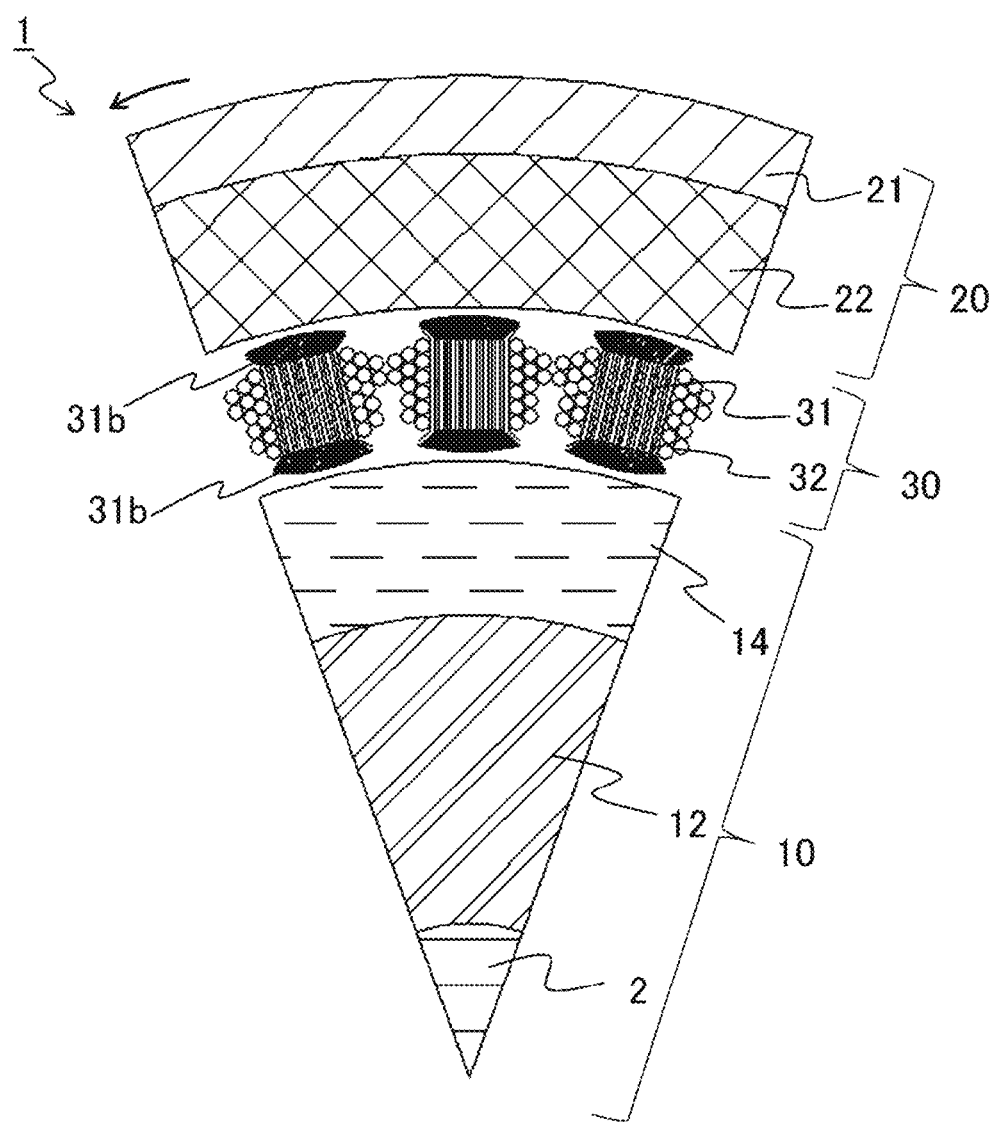
FIG. 5 is a sectional view along a direction perpendicular to a rotary shaft of a rotary electric machine according to embodiment 2.

FIG. 5 is a partial sectional view along a direction perpendicular to the rotary shaft of the rotary electric machine 1 according to embodiment 2.

In FIG. 5, the stator core 31 of the rotary electric machine 1 is formed by stacking, substantially in the circumferential direction, i.e., the rotation direction, thin steel sheets that are long in the axial direction. Both of the inner rotor 10 and the outer rotor 20 rotate at the same angular velocity counterclockwise in the drawing. At the side portions 31b which are end portions along the axial direction of the stator core 31 and are opposed to the inner rotor 10 side and the outer rotor 20 side, thin steel sheet surfaces are bent at an angle smaller than 90°. On the rotation-direction lagged side and advanced side, respectively, the side portions 31b are bent such that the bending angles gradually increase toward the radial-direction lagged side and advanced side, within an angle range of smaller than 90°. Although gaps are formed between the bent thin steel sheets, the gaps are filled with resin. The other configurations are the same as in embodiment 1.

The above configuration also provides the same effects as in embodiment 1. The side portions 31b of the stator core 31 are bent toward both of the radial-direction lagged side and advanced side in the rotation direction. Therefore, in a case where the rotation direction can become both directions equally, torque can be enhanced for rotations toward both sides.

In addition, since gaps between the thin sheets at the side portions 31b of the stator core 31 are filled with resin, the thin sheets are prevented from being bent or vibrated by the electromagnetic force, and thus the strength can be improved.

As described above, the rotary electric machine according to embodiment 2 provides the same effects as in embodiment 1. Further, since the side portions 31b of the stator core 31 are bent toward both of the radial-direction lagged side and advanced side in the rotation direction, it becomes possible to achieve torque enhancement of the rotary electric machine in both cases of two-direction rotations.

Embodiment 3

Hereinafter, a rotary electric machine as an electromagnetic device according to embodiment 3 will be described with reference to the drawings.

Figure 6:
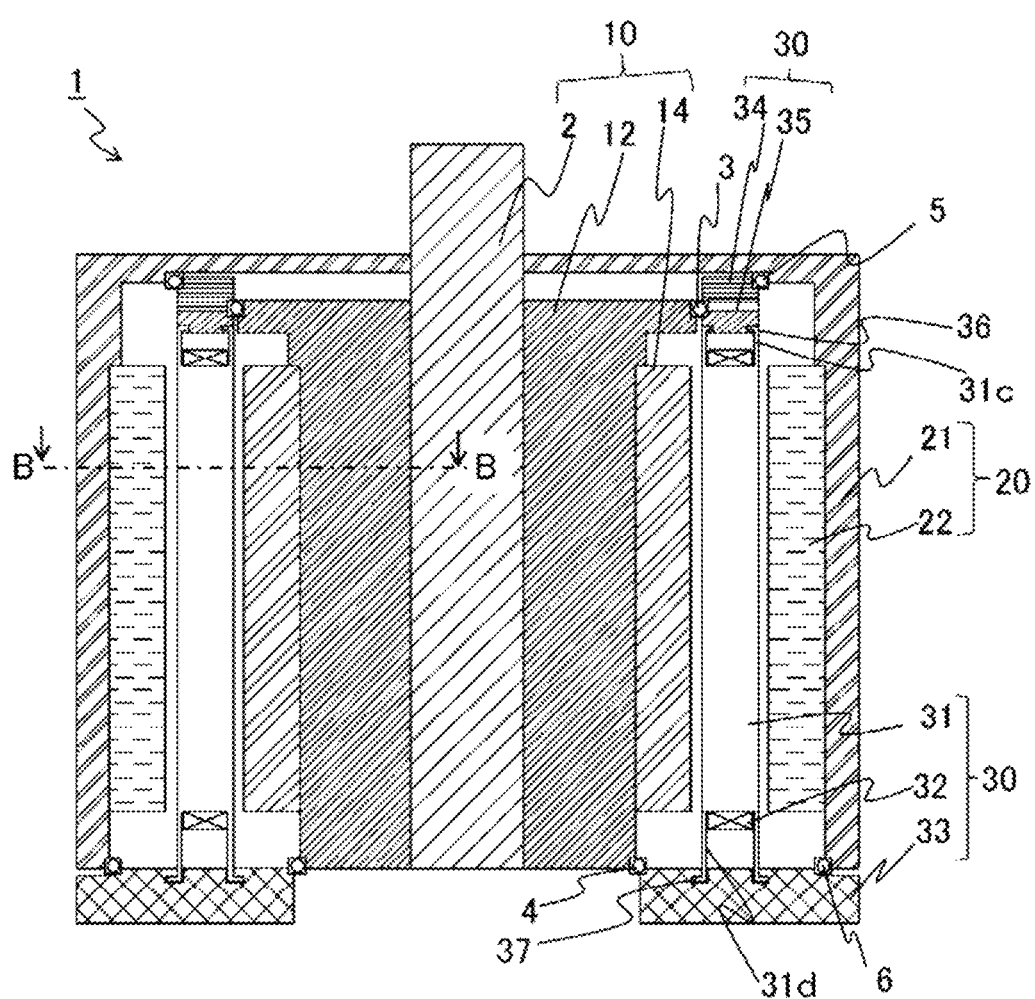
FIG. 6 is a sectional view along a rotary shaft of a rotary electric machine according to embodiment 3.

FIG. 6 is a sectional view along the rotary shaft, showing the rotary electric machine 1 according to embodiment 3. In FIG. 6, the stator core 31 is formed such that, at both ends in the axial direction thereof, both side portions on the inner rotor 10 side and the outer rotor 20 side extend and protrude in the axial direction from the body portion, the distal end portions 31c thereof on the load side are bent inward in L shapes, and the distal end portions 31d thereof on the fixed side are bent outward in L shapes.

In the same manner as described in embodiment 1, the natural length between both ends of the stator core 31 is smaller than the length between the fixed-side retention surfaces 37 of grooves in the non-load-side base 33 and the load-side retention surfaces 36 of L-shaped grooves provided at outer side parts of the load-side retention member 35, where the L-shaped parts of the distal end portions 31c, 31d at both ends of the stator core 31 are fixed. Accordingly, the L-shaped parts of the distal end portions 31d on one end side in the axial direction of the stator core 31 are fixed by being caught in the L-shaped grooves provided in the non-load-side base 33, and the L-shaped parts of the distal end portions 31c on the other end side in the axial direction of the stator core 31 are retained by being fitted to the grooves in the load-side retention member 35, so that tensile stress is applied.

The axial-direction sectional area of the stator core 31 described above is smaller at both distal end portions 31c, 31d than at the body portion wound with the stator coil 32, and the stator core 31 is fixed at positions extending from the body portion. Thus, the influence on the magnetic path is small as in embodiment 1.

Figure 7:
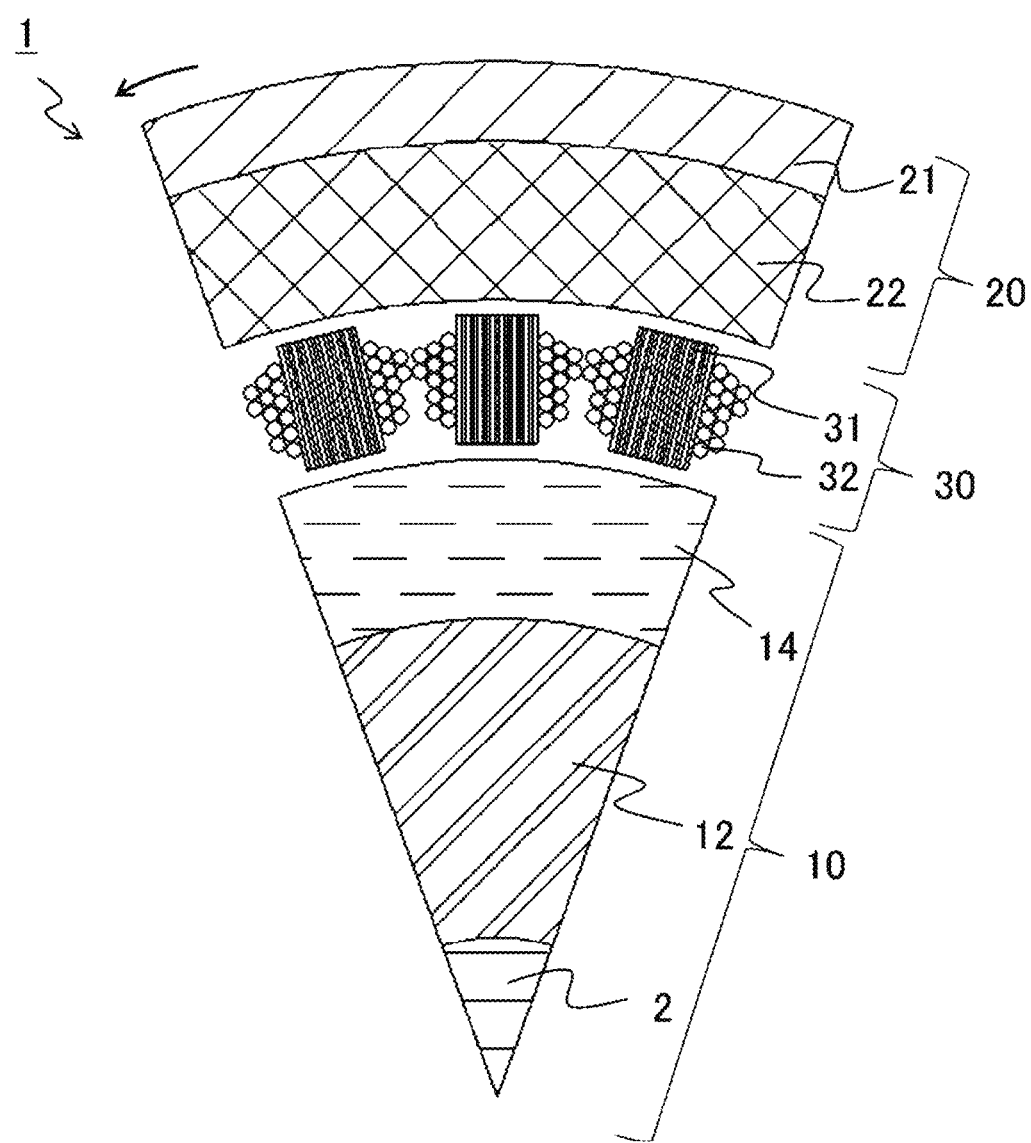
FIG. 7 is a partial sectional view along a direction perpendicular to the rotary shaft of the rotary electric machine according to embodiment 3.

FIG. 7 is a sectional view along a direction perpendicular to the rotary shaft of the rotary electric machine 1 and is a partial sectional view along a B-B line direction in FIG. 6. In FIG. 7, the stator core 31 is formed by stacking, substantially in the circumferential direction, i.e., the rotation direction, thin steel sheets that are long in the axial direction. Both of the inner rotor 10 and the outer rotor 20 rotate at the same angular velocity counterclockwise in the drawing, and both side portions on the inner rotor 10 side and the outer rotor 20 side which are both side portions along the axial direction of the stator core 31 are not bent and thus are along the same plane as the body portion corresponding to the winding part of the stator core 31. The other structures are the same as in embodiment 1.

As described above, according to embodiment 3, the same effects as in embodiment 1 are provided. That is, the stator 30 is provided between the inner rotor 10 and the outer rotor 20 which are movable with the shaft 2 as an axis, and the stator 30 includes the stator core 31 formed by stacking thin sheets in the rotation direction and is retained with tensile stress applied thereto in the axial direction, whereby the stator core 31 can be retained without deteriorating the magnetic property thereof. Thus, efficiency and torque of the rotary electric machine can be enhanced.

Embodiment 4

Hereinafter, a rotary electric machine as an electromagnetic device according to embodiment 4 will be described with reference to the drawings.

Figure 8:
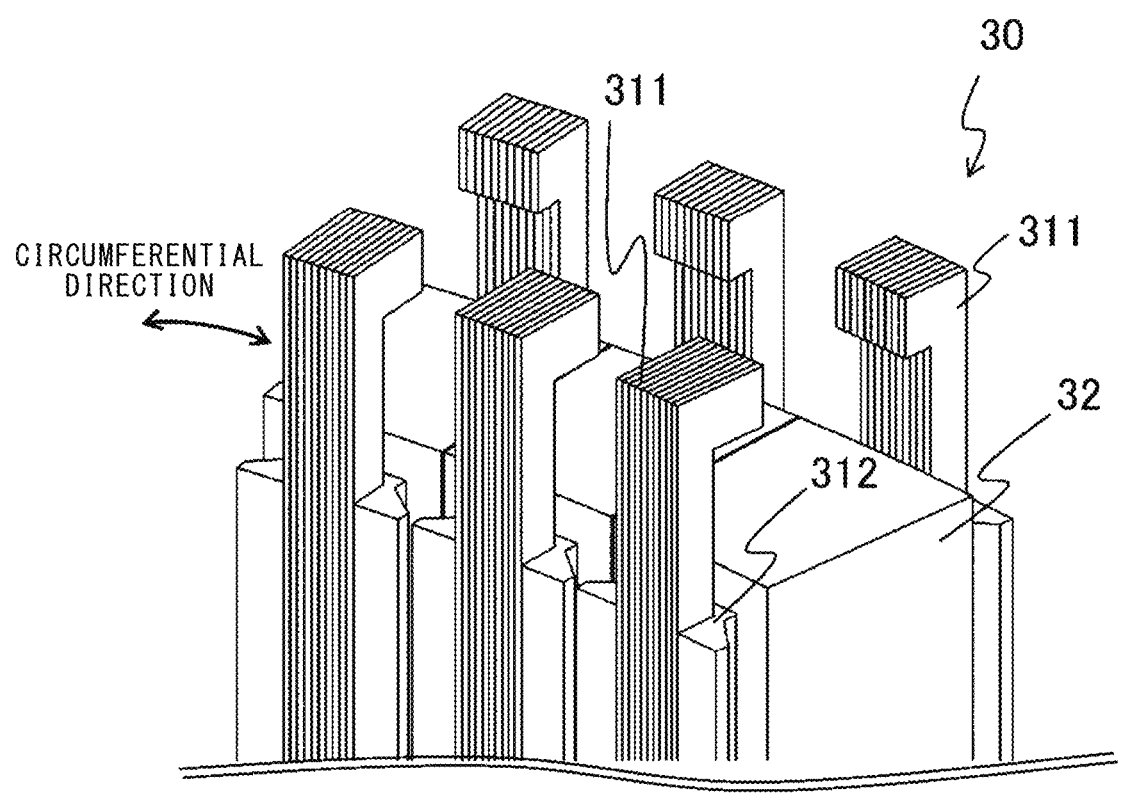
FIG. 8 is a partial perspective view showing the structure of a stator of a rotary electric machine according to embodiment 4.
Figure 9:
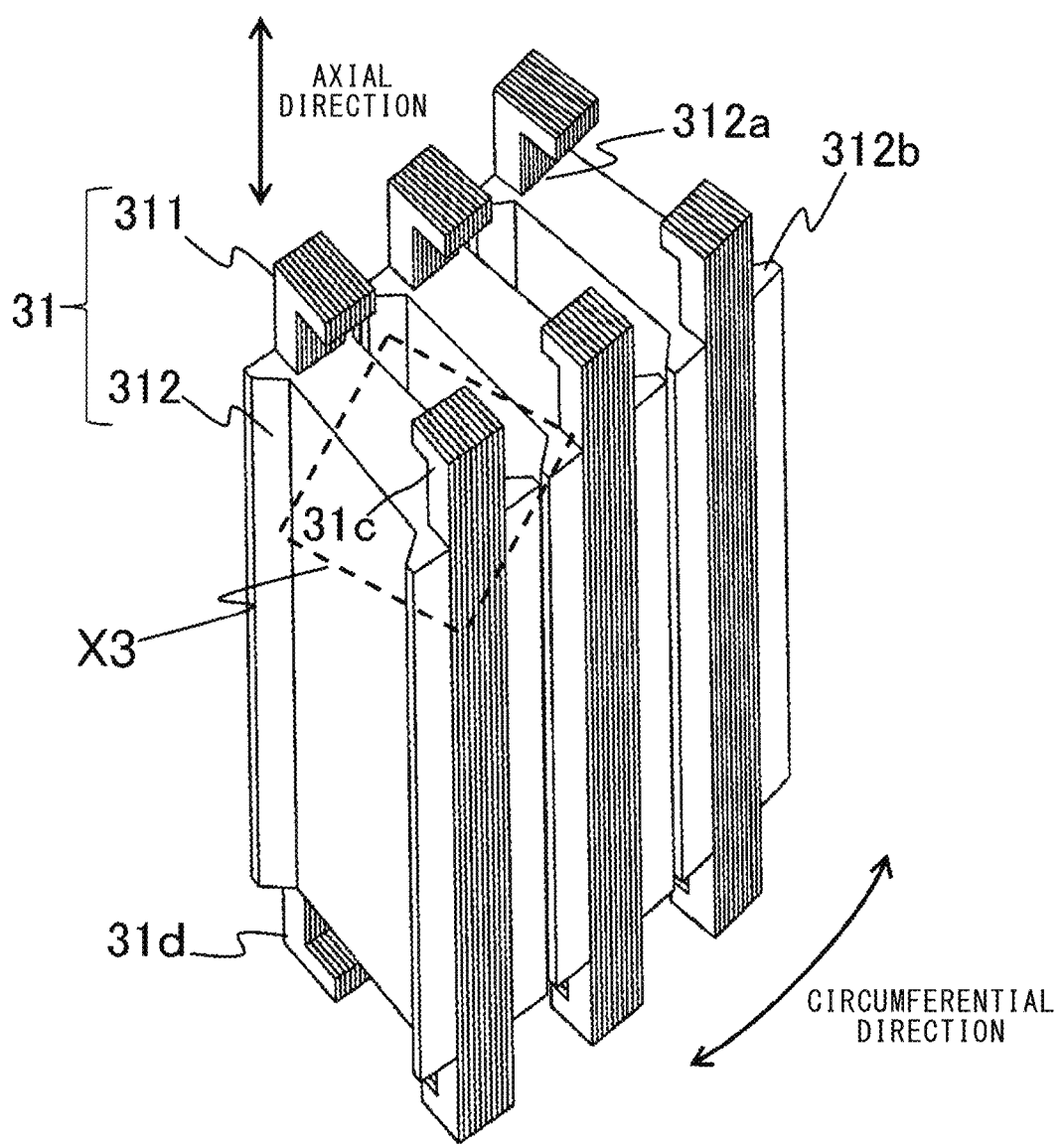
FIG. 9 is a partial perspective view showing the structure of the stator core of the rotary electric machine according to embodiment 4.
Figure 10:
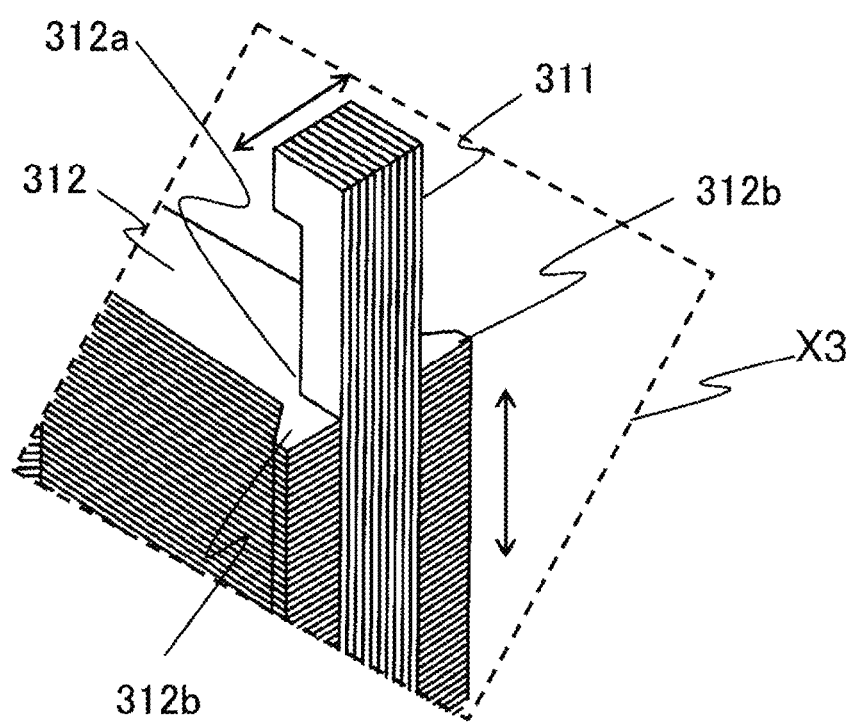
FIG. 10 is a partial perspective view showing the structure of the stator core of the rotary electric machine according to embodiment 4 and is a partial enlarged view of FIG. 9.

FIG. 8 is a perspective view showing part of the structure of the stator 30 of the rotary electric machine according to embodiment 4, FIG. 9 is a perspective view showing the structure of the stator core 31, and FIG. 10 is a partial enlarged view in a broken-line area X3 in FIG. 9. In embodiments 1 to 3, the stator core 31 is formed by stacking, substantially in the circumferential direction, i.e., the rotation direction, thin steel sheets that are long in the axial direction. In the stator core 31 of embodiment 3, at both ends in the axial direction thereof, both side portions on the inner rotor 10 side and the outer rotor 20 side extend and protrude in the axial direction from the body portion, the distal end portions 31c thereof on the load side are bent inward in L shapes, and the distal end portions 31d thereof on the non-load side are bent outward in L shapes. On the other hand, the stator core 31 of embodiment 4 is different in that the stator core 31 includes side portions 311 respectively opposed to the inner rotor 10 and the outer rotor 20, and a retention portion 312 retaining both side portions 311 and wound with the stator coil 32.

As shown in FIG. 9 and FIG. 10, both side portions 311 of the stator core 31 are formed by stacking, substantially in the circumferential direction, i.e., the rotation direction, thin electromagnetic steel sheets that are long in the axial direction. On the other hand, the retention portion 312 of the stator core 31 is formed by stacking, in the axial direction, electromagnetic steel sheets having a predetermined shape, to a height corresponding to the permanent magnets 14, 22 of the inner rotor 10 and the outer rotor 20. The retention portion 312 has substantially a rectangular shape and has cutouts 312a at center parts on the inner circumferential side which is the inner rotor side and the outer circumferential side which is the outer rotor side. In the cutouts 312a, both side portions 311 are inserted and retained. In addition, flanges 312b may be provided in the circumferential direction from the cutout 312a, as shown in the drawings. Both side portions 311 of the stator core 31 are retained in close contact with the retention portion 312 so that a magnetic flux in a direction perpendicular to the rotary shaft flows seamlessly. Both side portions 311 extend toward both sides in the axial direction from the retention portion 312 so as to have distal end portions 31c, 31d bent in L shapes.

The stator core 31 of embodiment 4 which includes both side portions 311 stacked in the circumferential direction and the retention portion 312 stacked in the axial direction is also retained with tensile stress applied thereto in the axial direction, as in embodiment 3. That is, in relation to FIG. 6 in embodiment 3, the natural lengths of both side portions 311 of the stator core 31 are smaller than the length between the fixed-side retention surfaces 37 of grooves in the non-load-side base 33 and the load-side retention surfaces 36 of L-shaped grooves provided at outer side parts of the load-side retention member 35, where the L-shaped parts at the distal ends of both side portions 311 of the stator core 31 are fixed. Accordingly, the L-shaped parts of the distal end portions 31c on the other end side in the axial direction of the stator core 31 are retained by being fitted to the grooves in the load-side retention member 35, so that tensile stress is applied.

In FIG. 9, the L-shaped parts at both ends in the axial direction of both side portions 311 are both bent inward toward the retention portion 312 side. However, as shown in FIG. 6, the ends on the fixed side may be bent outward in L shapes.

As in both side portions 311 of the stator core 31 in embodiment 4, parts of the stator core 31 are formed by stacking, substantially in the circumferential direction, i.e., the rotation direction, thin electromagnetic steel sheets that are long in the axial direction, and are retained with tensile stress applied thereto. Thus, magnetic property deterioration due to compressive stress is suppressed and efficiency can be enhanced.

Next, the retention portion 312 for retaining the side portions 311 of the stator core 31 will be described. In embodiments 1 to 3, the stator core 31 is formed by stacking, substantially in the circumferential direction, i.e., the rotation direction, thin steel sheets that are long in the axial direction. On the other hand, in embodiment 4, the side portions 311 are formed on both of the inner circumferential side and the outer circumferential side by stacking, substantially in the circumferential direction, i.e., the rotation direction, thin steel sheets that are long in the axial direction as in embodiments 1 to 3, and the retention portion 312 for retaining both side portions 311 is formed by stacking electromagnetic steel sheets in the axial direction. Therefore, as described above, in a direction perpendicular to the axis, a substantially rectangular piece corresponding to each of electromagnetic steel sheets composing the retention portion 312 is present and thus it becomes easy to perform working into a desired shape. As shown in FIG. 9 and FIG. 10, the retention portion 312 has substantially a rectangular shape and has, at center parts on the inner circumferential side and the outer circumferential side, the cutouts 312a in which both side portions 311 are inserted and retained. The flanges 312b are provided in the circumferential direction from the cutout 312a. Working into such a shape also becomes easy.

Meanwhile, as shown in FIG. 7, in the axial-direction cross-section of the rotary electric machine 1, the stator 30 is provided between the inner rotor 10 and the outer rotor 20, and the stator cores 31 are arranged at constant intervals. Therefore, a magnetic flux due to the structure in which permeability is not constant as seen from the gaps between the stator 30, and the inner rotor 10 and the outer rotor 20, is generated. The generated magnetic flux is called a spatial harmonic, leading to loss.

In the present embodiment, the retention portions 312 have the flanges 312b serving to fill spaces between circumferential-direction adjacent parts of the stator 30, whereby a spatial harmonic can be reduced. In addition, since the retention portion 312 is stacked in the rotary shaft direction, the area of the conductor interlinked by a circumferential-direction interlinkage magnetic flux is small. Thus, the resistance of the conductor increases and eddy current can be reduced.

Next, a method for attachment between the side portions 311 and the retention portion 312 will be described.

Figure 11A:
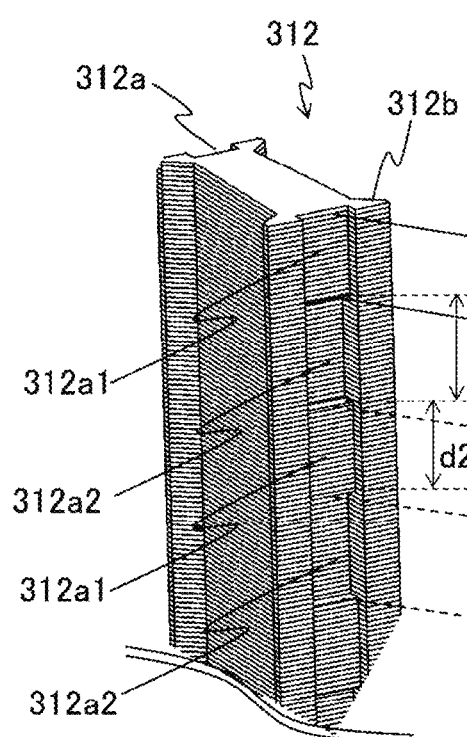
FIGS. 11A and 11B are
Figure 11B:
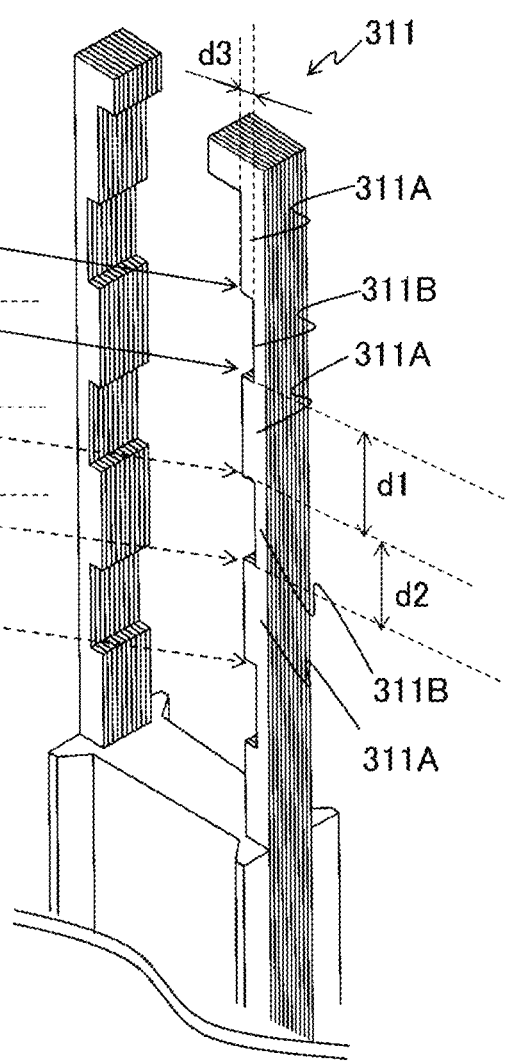

FIG. 11A shows the retention portion 312 stacked in the axial direction and FIG. 11B shows both side portions 311 stacked in the circumferential direction. The cutout 312a of the retention portion 312 includes two types of cutouts, i.e., shallowly-cut cutouts 312a1 and deeply-cut cutouts 312a2, and the retention portion 312 is stacked such that the cutouts 312a1 and 312a2 have predetermined thicknesses d2, d1, respectively. On both of the inner circumferential side and the outer circumferential side, the stacked parts at the shallowly-cut cutouts 312a1 project relative to the stacked parts at the deeply-cut cutouts 312a2.

The side portions 311 are arranged such that the inner circumferential side and the outer circumferential side thereof are opposed to each other, and have, on the retention portion sides, protruding parts 311A and recessed parts 311B sequentially formed in lengths corresponding to the thicknesses d1, d2, respectively. A level difference d3 between the protruding part 311A and the recessed part 311B corresponds to the difference between the cutting depths of the shallowly-cut cutout 312a1 and the deeply-cut cutout 312a2 of the retention portion 312. The retention portion 312 in FIG. 11A and both side portions 311 in FIG. 11B are fitted such that the stacked part at the shallowly-cut cutout 312a1 and the recessed part 311B are fitted to each other and the stacked part at the deeply-cut cutout 312a2 and the protruding part 311A are fitted to each other. That is, the recess and protrusion shapes of both members are fitted to each other in the direction of arrows in the drawing, thus forming the stator core 31 as shown in FIG. 9.

As described above, since the recess and protrusion shapes formed on the cutouts 312a of the retention portion 312 and the recess and protrusion shapes formed on both side portions 311 are fitted to each other, the stator core 31 can be formed in a state in which the thin-sheet-shaped electromagnetic steel sheets stacked in directions different from each other are in close contact with each other without coming apart.

The recess and protrusion shapes formed on the cutouts 312a of the retention portion 312 and the recess and protrusion shapes formed on both side portions 311 are not limited to the above ones. For example, shapes not only for fitting in the radial direction but also for fitting or engaging in the axial direction may be adopted.

Figure 12:
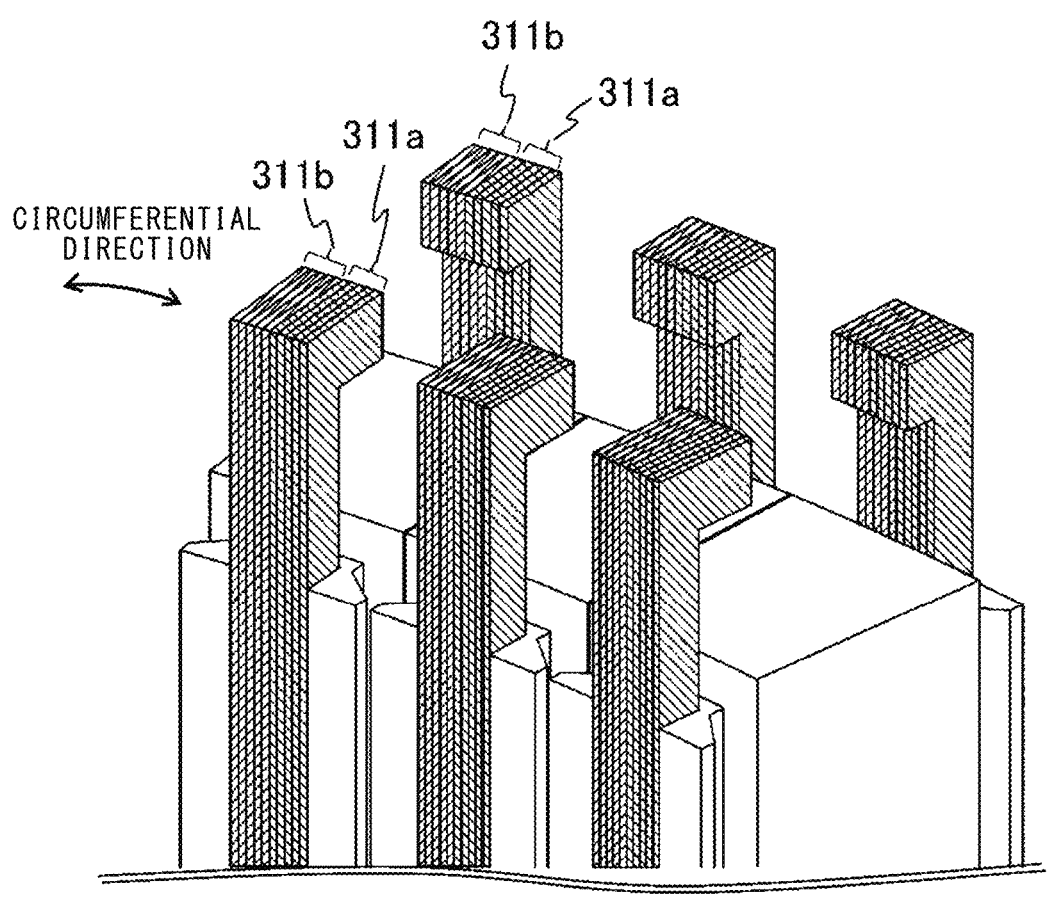
FIG. 12 is a partial perspective view showing the structure of another stator of the rotary electric machine according to embodiment 4.

FIG. 12 shows a modification of FIG. 8 and is a perspective view showing the configuration of another stator 30 according to embodiment 4. Difference from FIG. 8 is that, in both side portions 311 of the stator core 31, parts on the rotation-direction advanced side in FIG. 7 are formed by structural bodies 311b which are not stacked electromagnetic steel sheets and are made of a non-metal or non-magnetic material. Parts on the rotation-direction lagged side are formed by stacked bodies 311a of electromagnetic steel sheets.

In electromagnetic steel sheets stacked in the circumferential direction, in-plane eddy current is generated and the generated eddy current tends to be greater on the rotation-direction advanced side. Therefore, if the parts on the rotation-direction advanced side are formed by members that are not electromagnetic steel sheets as shown in FIG. 12, loss due to eddy current on the rotation-direction advanced side can be reduced. In the present embodiment, high-strength resin is used as the structural bodies 311b made of a non-metal or non-magnetic material. The shapes of the structural bodies 311b and the stacked bodies 311a of electromagnetic steel sheets are not limited to the shown ones, and they may be different in size in the circumferential direction, or the like.

As described above, according to embodiment 4, both side portions 311 composing the stator core 31 are formed by stacking, substantially in the circumferential direction, i.e., the rotation direction, thin electromagnetic steel sheets that are long in the axial direction, and tensile stress is applied thereto. Thus, as in embodiments 1 to 3, magnetic property deterioration due to compressive stress is suppressed and efficiency can be enhanced.

In addition, the retention portion 312 of the stator core for retaining both side portions 311 is formed by stacking substantially-rectangular electromagnetic steel sheets in the axial direction, and has flange shapes on the inner circumferential side and the outer circumferential side. Such a structure contributes to suppression of a spatial harmonic and eddy current, thus achieving efficiency enhancement.

Further, in both side portions 311 composing the stator core 31, parts on the rotation-direction advanced side are formed by the structural bodies 311b which are not stacked bodies of electromagnetic steel sheets and are made of a non-metal or non-magnetic material. Thus, it becomes possible to reduce loss due to eddy current.

Embodiment 5

Hereinafter, a rotary electric machine as an electromagnetic device according to embodiment 5 will be described with reference to the drawings.

Figure 13:
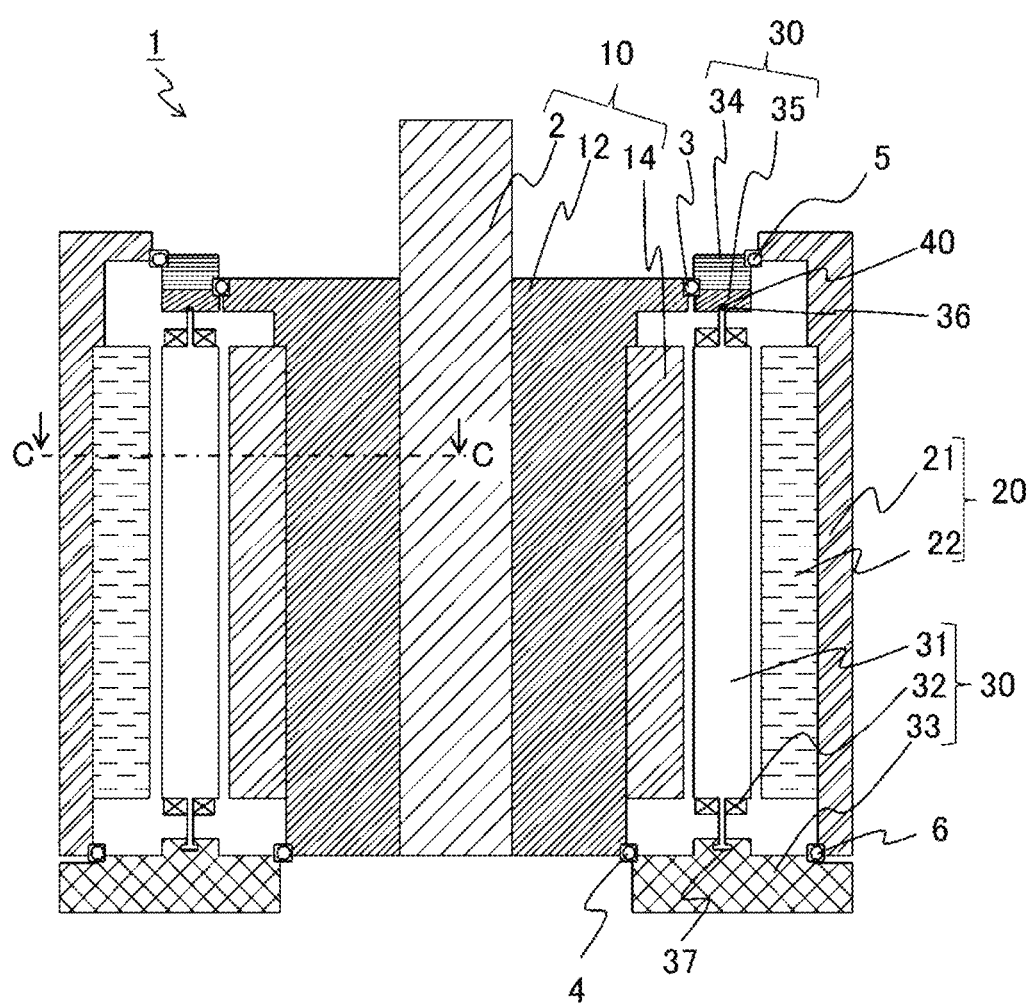
FIG. 13 is a sectional view along a rotary shaft of a rotary electric machine according to embodiment 5.

FIG. 13 is a sectional view along the rotary shaft, showing the structure of the rotary electric machine 1 according to embodiment 5. In FIG. 13, difference from embodiment 1 is that the outer shaft 21 is not fixed to the shaft 2. Therefore, the inner rotor 10 and the outer rotor 20 of the rotary electric machine 1 are not connected to each other, and for example, the inner rotor 10 and the outer rotor 20 rotate in directions opposite to each other, and the outer rotor 20 rotates at an angular velocity that is ½ of the angular velocity of the inner rotor 10.

Figure 14:
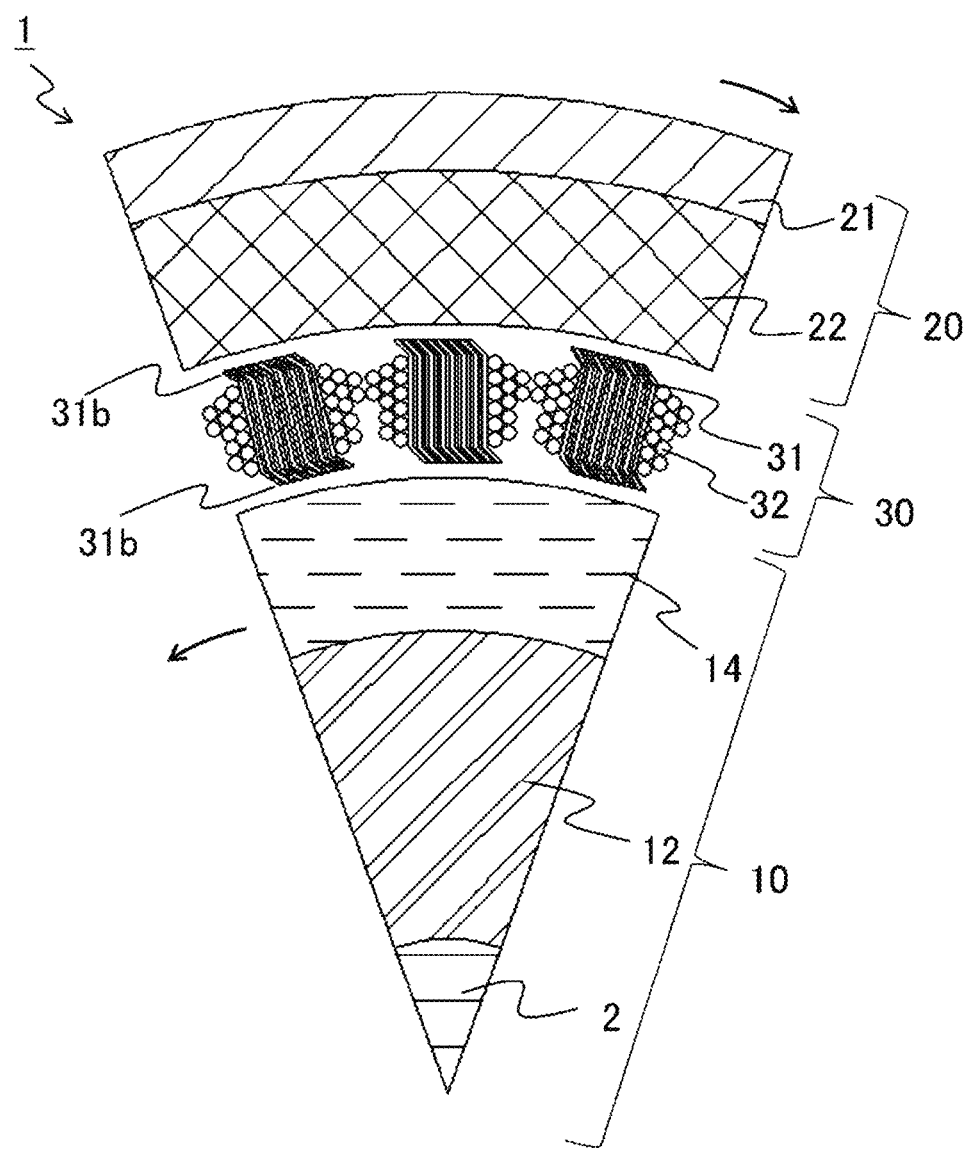
FIG. 14 is a partial sectional view along a direction perpendicular to the rotary shaft of the rotary electric machine according to embodiment 5.

FIG. 14 is a sectional view along a direction perpendicular to the rotary shaft of the rotary electric machine 1 and is a partial sectional view along a C-C line direction in FIG. 13. In FIG. 14, the inner rotor 10 rotates counterclockwise and the outer rotor 20 rotates clockwise. The stator core 31 is formed by stacking, substantially in the circumferential direction, thin steel sheets that are long in the axial direction. At the side portions 31b which are both end portions along the axial direction of the stator core 31 and are opposed to the inner rotor 10 and the outer rotor 20, thin electromagnetic steel sheet surfaces are bent toward the rotation-direction lagged side at an angle smaller than 90°. That is, since the rotation direction is opposite to that of the outer rotor 20 in embodiment 1, it is found that the side portion 31b of the stator core 31 on the outer rotor 20 side is bent toward the opposite side as compared to FIG. 3, so as to be directed toward the rotation-direction lagged side.

The other configurations are the same as in embodiment 1, and the stator core 31 in embodiment 5 is also attached with tensile stress applied thereto.

In the above description, the example in which the inner rotor 10 and the outer rotor 20 rotate in directions opposite to each other and the angular velocity of the outer rotor 20 is ½ of that of the inner rotor 10, has been shown. However, the rotation directions of the inner rotor 10 and the outer rotor 20 may be the same and their rotation speeds may be set independently of each other. In a case where the rotation directions of the inner rotor 10 and the outer rotor 20 are the same, the side portions 31b of the stator core 31 on the inner rotor 10 side and the outer rotor 20 side may be bent toward the same side so as to be directed toward the rotation-direction lagged side.

As described above, according to embodiment 5, the same effects as in embodiment 1 are provided. That is, the stator 30 is provided between the inner rotor 10 and the outer rotor 20 which are movable with the shaft 2 as an axis, and the stator 30 includes the stator core 31 formed by stacking thin sheets in the rotation direction and is retained with tensile stress applied thereto in the axial direction, whereby the stator core 31 can be retained without deteriorating the magnetic property thereof. Thus, efficiency and torque of the rotary electric machine can be enhanced.

In addition, since the inner rotor 10 and the outer rotor 20 of the rotary electric machine 1 are not connected to each other, the rotation directions and the rotation speeds of the respective rotors can be set independently of each other. Therefore, even in a case where the respective rotors drive different targets, control can be performed with their rotation directions and rotation speeds set respectively.

Embodiment 6

Hereinafter, a rotary electric machine as an electromagnetic device according to embodiment 6 will be described.

Figure 15:
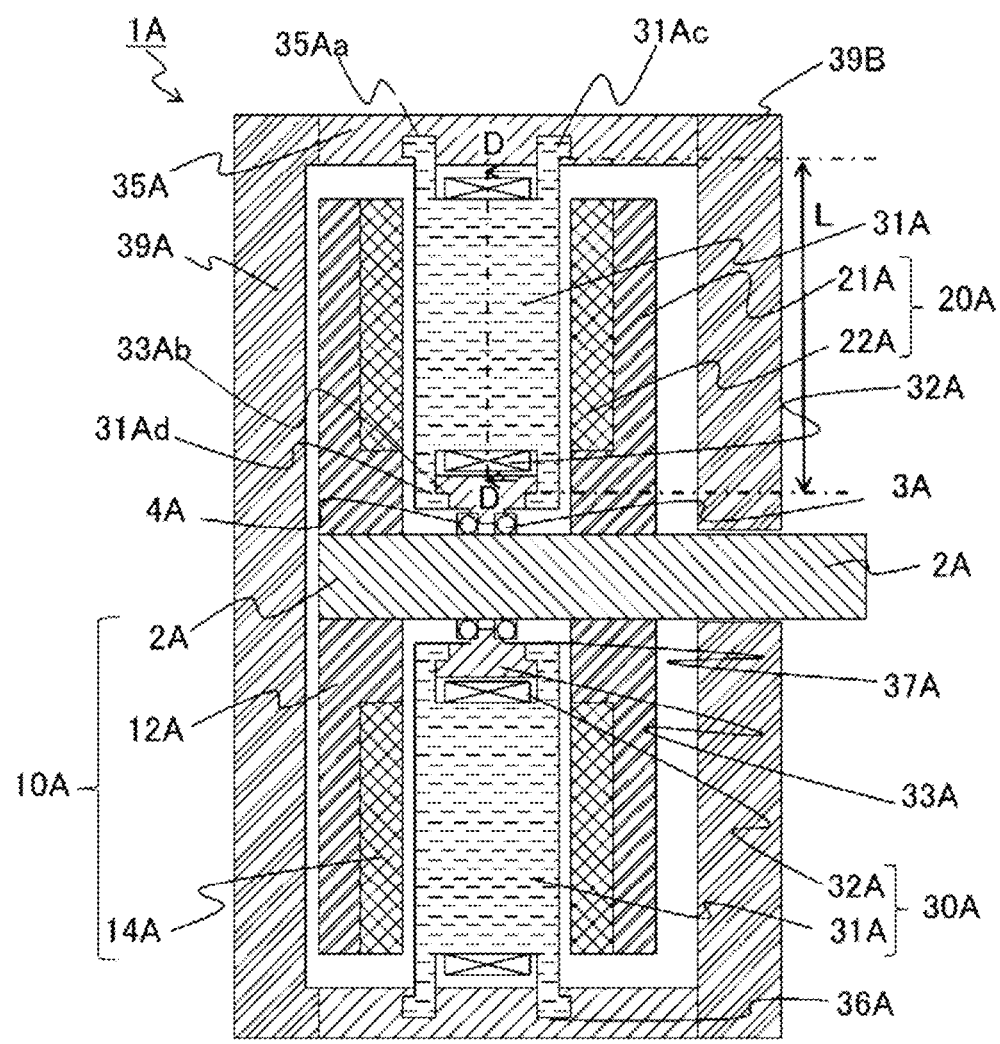
FIG. 15 is a sectional view along a rotary shaft of a rotary electric machine according to embodiment 6.

FIG. 15 is a sectional view along the rotary shaft, showing the structure of a rotary electric machine 1A according to embodiment 6. In FIG. 15, the rotary electric machine 1A includes two rotors which are a non-load-side rotor 10A and a load-side rotor 20A, and a stator 30A provided between the two rotors in the radial direction, and is formed as an axial gap motor of a double-rotor type.

The non-load-side rotor 10A includes a shaft 2A, a non-load-side boss 12A press-fitted and fixed to the shaft 2A, and a permanent magnet 14A adhered and fixed to the load side of the non-load-side boss 12A.

The load-side rotor 20A includes a load-side boss 21A fixed to the shaft 2A, and a permanent magnet 22A adhered and fixed to the non-load side of the load-side boss 21A.

The stator 30A is provided between the non-load-side rotor 10A and the load-side rotor 20A, and rotatably retains the non-load-side rotor 10A and the load-side rotor 20A by a load-side inner bearing 3A and a non-load-side inner bearing 4A.

In the stator 30A, a stator core 31A is provided between a radially-outer-side retention member 35A and a radially-inner-side retention member 33A, and a stator coil 32A is wound around the stator core 31A. The radially-outer-side retention member 35A is attached to a non-load-side base 39A and a load-side base 39B provided separately from the shaft 2A, thus surrounding the two rotors, i.e., the non-load-side rotor 10A and the load-side rotor 20A. The shaft 2A rotatably protrudes from a center part of the load-side base 39B and is separate from the load-side base 39B.

The stator core 31A is formed by stacking, substantially in the circumferential direction, i.e., the rotation direction, thin electromagnetic steel sheets that are long in the radial direction. At both ends in the radial direction, both radial-direction side portions of the stator core 31A on the non-load-side rotor 10A side and the load-side rotor 20A side extend and protrude. A distal end portion 31Ac on the radially outer side has an L shape bent outward in the axial direction, and this L-shaped part is engaged with a groove 35Aa in the radially-outer-side retention member 35A. A distal end portion 31Ad on the radially inner side of the stator core 31A has an L shape bent inward in the axial direction, and is fixed by being engaged with an L-shaped groove 33Ab provided in the radially-inner-side retention member 33A.

The natural length between the engaged parts of both distal end portions 31Ac, 31Ad in the radial direction of the stator core 31A is smaller than a length L between the bottom surface of the groove 35Aa in the radially-outer-side retention member 35A and the bottom surface of the L-shaped groove 33Ab provided at an outer side part of the radially-inner-side retention member 33A. Therefore, the stator core 31A is extended in the radial direction with tensile stress applied thereto.

Figure 16:
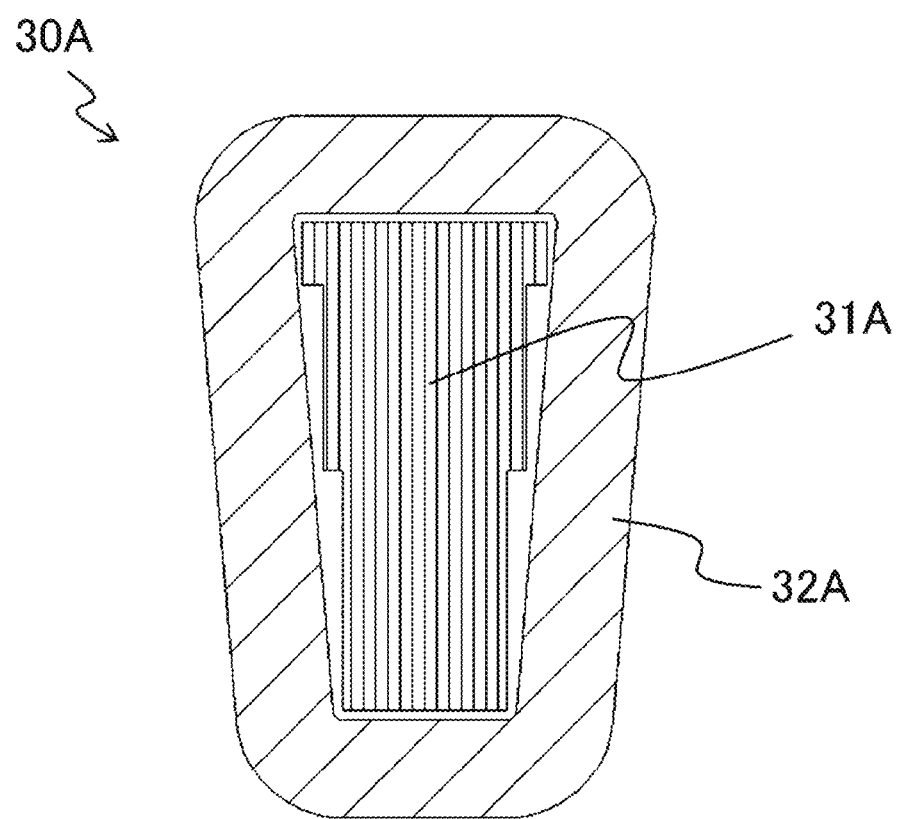
FIG. 16 is a sectional view along a direction perpendicular to the rotary shaft of the rotary electric machine according to embodiment 6 and shows the structure of a stator.

FIG. 16 is a sectional view showing the structure of the stator 30A and is a partial sectional view along a D-D line direction in FIG. 15. In the drawing, the rotary electric machine 1A has a concentrated-winding configuration with 10 poles and 12 slots. The stator core 31A is formed by stacking, substantially in the circumferential direction, thin steel sheets that are long in the radial direction, as described above. The non-load-side rotor 10A and the load-side rotor 20A rotate at the same angular velocity.

The thin steel sheets of the stator core 31A are electromagnetic steel sheets manufactured by rolling, and are arranged such that the rolling direction coincides with the axial direction of the stator core 31A, i.e., the direction in which the non-load-side rotor 10A and the load-side rotor 20A are opposed to each other.

As described above, according to embodiment 6, even in the rotary electric machine forming an axial gap motor of a double-rotor type, since the stator core 31A is fixed with tensile stress applied thereto as in embodiments 1 to 5, magnetic property deterioration due to stress does not occur and torque is improved. Thus, a high-efficiency rotary electric machine can be provided.

Embodiment 7

Hereinafter, a magnetic gear as an electromagnetic device according to embodiment 7 will be described.

Figure 17:
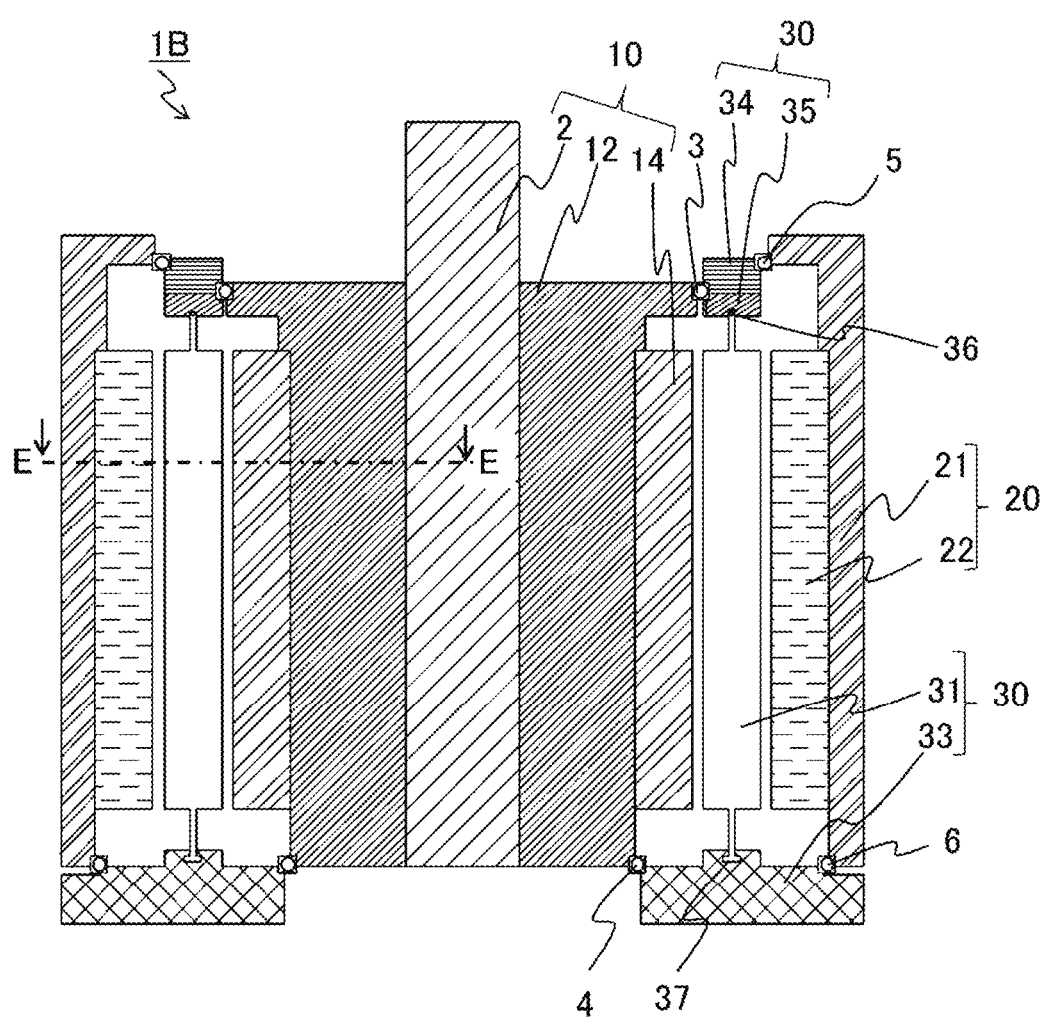
FIG. 17 is a sectional view along a rotary shaft of a magnetic gear according to embodiment 7.
Figure 18:
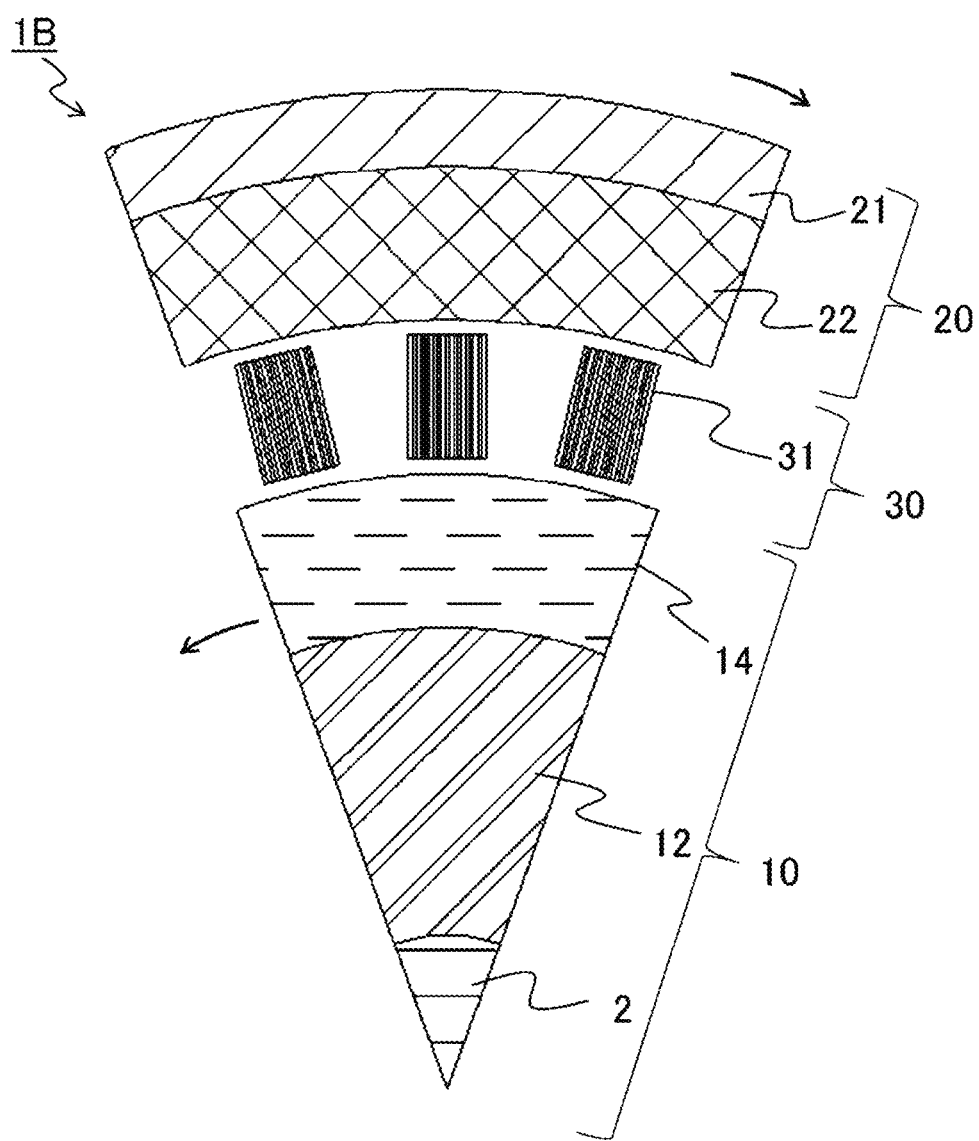
FIG. 18 is a sectional view along a direction perpendicular to the rotary shaft of the magnetic gear according to embodiment 7.

FIG. 17 is a sectional view along the rotary shaft, showing the structure of a magnetic gear 1B according to embodiment 7, and FIG. 18 is a partial sectional view along an E-E line direction. The magnetic gear 1B does not include the stator coil 32, and FIG. 17 corresponds to a case where the stator coil 32 is not wound around the stator core 31 in FIG. 13 in embodiment 5. As shown in FIG. 18, the stator core 31 is flat and does not have bent portions at both side portions in the radial direction. For the inner rotor 10 and the outer rotor 20, the stator cores 31 serve as pole pieces for modulating magnetic fluxes of the inner rotor 10 and the outer rotor 20 in accordance with greatness/smallness of magnetic resistance based on presence/absence of the stator cores 31 in the circumferential direction.

In FIG. 17 and FIG. 18, the inner rotor 10 and the outer rotor 20 of the magnetic gear 1B are not connected to each other. The inner rotor 10 rotates counterclockwise in the drawing, and the outer rotor 20 rotates clockwise in the drawing at the same electric angular velocity as the inner rotor 10. Here, for example, it is assumed that the number of poles of the outer rotor 20 is 60 and the number of poles of the inner rotor 10 is 12, so that the number of poles of the outer rotor 20 is 5 times the number of poles of the inner rotor 10. In this case, the magnetic gear having a speed reduction ratio of 5 can be obtained. While the number of poles of the outer rotor 20 which is a low-speed rotor is 60 and the number of poles of the inner rotor 10 which is a high-speed rotor is 12, the number of the stator cores 31 which are pole pieces in the circumferential direction is set to satisfy (number of pole pieces)=(number of poles of low-speed rotor)±(number of poles of high-speed rotor). Therefore, the number of the stator cores 31 is 60±12=72 or 48, and in this example, is set to 48.

The other configurations are the same as in embodiment 5. That is, also in the present embodiment, the stator core 31 is extended in the axial direction and fixed with tensile stress applied thereto.

In the above description, it is described that the rotation directions of the inner rotor 10 and the outer rotor 20 are opposite to each other, but their rotation directions may be the same. In this case, the number of the stator cores 31 which are pole pieces may be 72 instead of 48. In addition, the numbers of poles of the inner rotor 10 and the outer rotor 20 may be set in accordance with the change gear ratio of the magnetic gear for targets to be driven by the inner rotor 10 and the outer rotor 20.

As described above, according to embodiment 7, in the magnetic gear 1B, the stator core 31 is extended in the axial direction and fixed with tensile stress applied thereto, whereby the stator core 31 can be retained without deteriorating the magnetic property thereof. Thus, efficiency and torque of the magnetic gear can be enhanced.

Embodiment 8

Hereinafter, a linear motor as an electromagnetic device according to embodiment 8 will be described.

Figure 19:
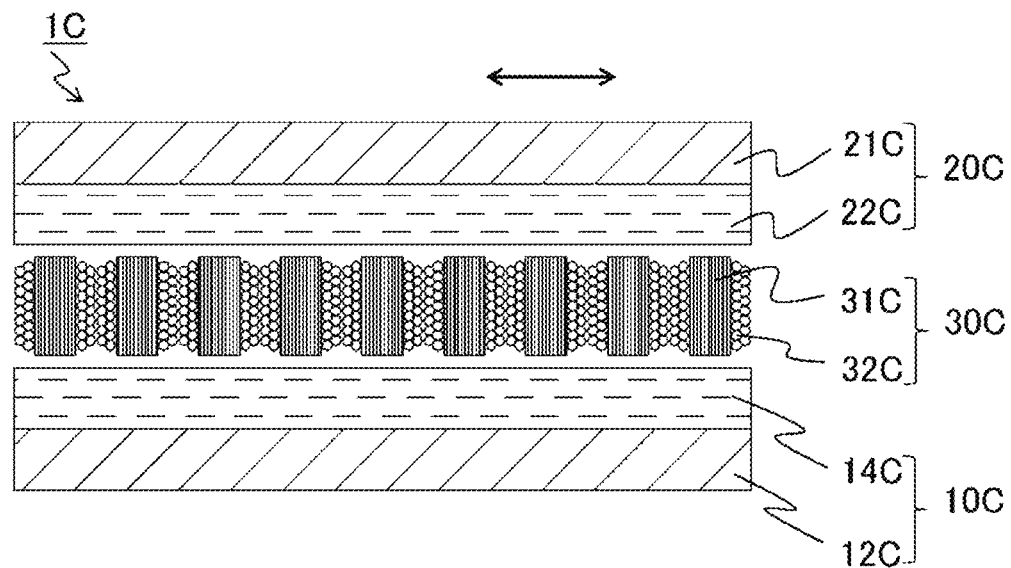
FIG. 19 is a sectional view along a movable axis, showing the structure of a linear motor according to embodiment 8.

FIG. 19 is a sectional view along a movable axis of a linear motor 1C according to embodiment 8. In FIG. 19, the linear motor 1C includes a stator 30C provided between two movable elements 10C, 20C. The first movable element 10C on one side of the stator 30C and the second movable element 20C on the other side thereof are retained movably in an arrow direction in the drawing by a linear guide (not shown).

The first movable element 10C is formed such that a permanent magnet 14C is pasted to a first movable base 12C. The second movable element 20C is formed such that a permanent magnet 22C is pasted to a second movable base 21C.

The stator 30C includes a stator core 31C and a stator coil 32C wound around the stator core 31C. The stator core 31C is extended in a direction perpendicular to the movable direction of the first movable element 10C and the second movable element 20C and parallel to the first movable element 10C and the second movable element 20C, and is retained at both end portions. Both end portions of the stator core 31C are retained and fixed by, for example, bolts, with tensile stress applied thereto in the extended direction of the stator core 31C. As in embodiments 1 to 6, the stator core 31C is formed by stacking thin sheets. Specifically, the stator core 31C is formed by stacking, in the movable direction of the first movable element 10C and the second movable element 20C, thin sheets rolled such that the rolling direction coincides with the opposing direction to the first movable element 10C and the second movable element 20C.

As described above, according to embodiment 8, the same effects as in embodiment 1 are provided. That is, the stator core 31 can be retained without deteriorating the magnetic property thereof. Thus, efficiency and torque of the linear motor can be enhanced.

Embodiment 9

Hereinafter, an aircraft according to embodiment 9 will be described.

Figure 20:
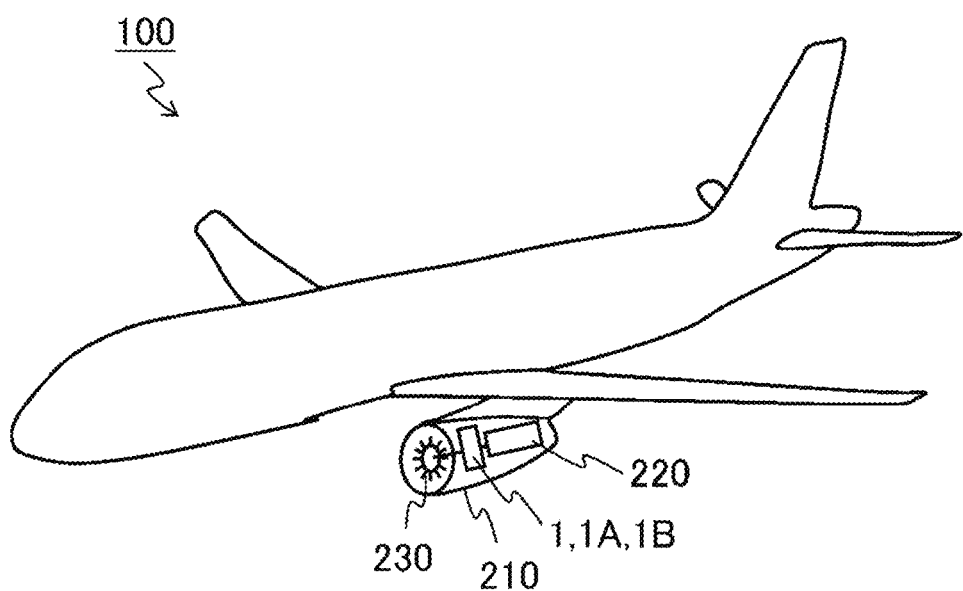
FIG. 20 is a schematic view showing an aircraft using an electromagnetic device according to embodiment 9.

FIG. 20 shows an example of an aircraft 100 according to embodiment 9, and the electromagnetic device described in each embodiment 1 to 7 is provided thereto. In FIG. 20, in an engine case 210 of the aircraft 100, a fan 230, the rotary electric machine 1, 1A, the magnetic gear 1B, and an engine 220 are arranged and connected via a shaft. The rotary electric machine 1, 1A is a motor and is used for driving the fan 230. The magnetic gear 1B is used as a transmission for increasing/reducing the speed.

In the case where the rotary electric machine 1, 1A is provided, although not shown, a gear for changing the number of revolutions may be provided between the fan 230 and the rotary electric machine 1, 1A and/or between the rotary electric machine 1, 1A and the engine 220. In this case, the gear may be a mechanical gear such as a spur gear or a planetary gear, or may be the magnetic gear 1B.

In the case where the rotary electric machine 1, 1A is provided, in FIG. 20, the rotary electric machine 1, 1A and the engine 220 are arranged coaxially with the fan 230. However, they may be arranged with different axes via a gear or the like, whereby the same effects are provided.

In the rotary electric machine shown in each embodiment 1 to 6, since tensile stress is applied to the stator core, the stator core can be assuredly retained without deteriorating the magnetic property and high torque output can be obtained. Therefore, the rotary electric machine is suitably applied to a rotation target provided to the aircraft.

In the magnetic gear shown in embodiment 7, the stator core can be assuredly retained without deteriorating the magnetic property and a part subjected to wear is not present as compared to a mechanical gear. Therefore, the magnetic gear is suitably applied to a mechanism component provided to the aircraft.

Figure 21A:
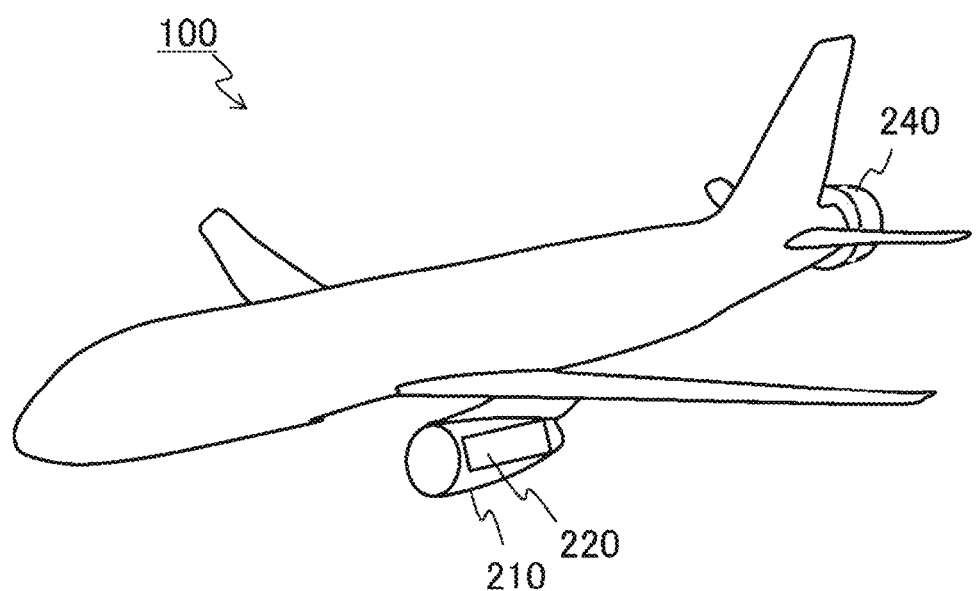
FIGS. 21A and 21B are
Figure 21B:
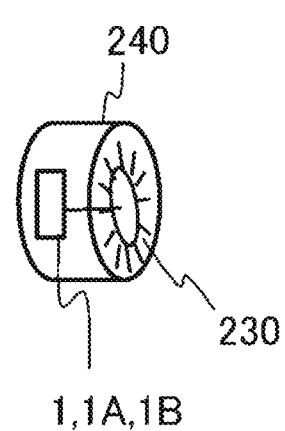

FIGS. 21A and 21B show another example of the aircraft 100 according to embodiment 9. FIG. 21A shows the aircraft 100 having a fan case 240 at a tail, and FIG. 21B is a schematic enlarged view of the fan case 240. In the drawings, similarly, the electromagnetic device described in each embodiment 1 to 7 is provided. In FIG. 20, the electromagnetic device is stored in the same engine case 210 as the engine 220, whereas, as shown in FIGS. 21A and 21B, the electromagnetic device may be stored in a case different from the case for the engine 220, to drive a driving target. FIGS. 21A and 21B show the example in which the rotary electric machine 1, 1A or the magnetic gear 1B is connected via a shaft to the fan 230 in the fan case 240 at the tail. In the case where the magnetic gear 1B is connected, the rotary electric machine 1, 1A or the engine 220 is further connected to perform driving.

Alternatively, without having the engine 220, the aircraft 100 may have the rotary electric machine 1, 1A which is the electromagnetic device, as a drive motive-power source. Although not shown, the rotary electric machine 1, 1A may be attached to a blade of a helicopter, a multicopter having a plurality of rotor blades, or the like, instead of the aircraft 100 having fixed wings, so as to be used as a drive source.

As described above, according to embodiment 9, the electromagnetic device shown in each embodiment 1 to 7 is applied to an aircraft. Thus, the stator core can be assuredly retained without deteriorating the magnetic property and high torque output can be obtained, whereby the flight range per fuel can be improved.

Modification and Supplementary Note of Embodiments

In the above embodiments, it is desirable that the stator core is retained with tensile stress applied thereto at a level not exceeding 100 MPa, but the tensile stress level may be such a level as not to cause breakdown or breakage by the stress.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

In the above embodiments, the rotary electric machines 1, 1A are described as a motor. However, the same effects are provided even when the rotary electric machines 1, 1A operate as an electric generator.

DESCRIPTION OF THE REFERENCE CHARACTERS 1, 1A rotary electric machine
1B magnetic gear
1C linear motor
2, 2A shaft
3, 3A load-side inner bearing
4, 4A non-load-side inner bearing
5 load-side outer bearing
6 non-load-side outer bearing
10 inner rotor
10A non-load-side rotor
10C first movable element
12 boss
12A non-load-side boss
12C first movable base
14, 14A, 14C permanent magnet
20 outer rotor
20A load-side rotor
20C second movable element
21 outer shaft
21A load-side boss
21C second movable base
22, 22A, 22C permanent magnet
30, 30A, 30C stator
31, 31A, 31C stator core
31a body portion
31b side portion
31c, 31d distal end portion
31Ac, 31Ad distal end portion
32, 32A, 32C stator coil
33 non-load-side base
33A radially-inner-side retention member
33Ab groove
33a groove
34 load-side base
35 load-side retention member
35A radially-outer-side retention member
35Aa groove
36 load-side retention surface
37 fixed-side retention surface
38 bolt
39A non-load-side base
39B load-side base
100 aircraft
210 engine case
220 engine
230 fan
240 fan case
311 side portion
311A protruding part
311B recessed part
311a stacked body
311b structural body
312 retention portion
312a, 312a1, 312a2 cutout
312b flange

The invention claimed is:

1. An electromagnetic device comprising:
two movable parts movable in parallel or antiparallel to each other; and
a stator core arranged with two surfaces thereof respectively opposed to the two movable parts,
wherein at least part of the stator core is formed by stacking thin sheets in a movable direction of the movable parts and is retained with tensile stress applied thereto in a direction parallel to the two surfaces opposed to the two movable parts and perpendicular to the movable direction of the movable parts.

2. The electromagnetic device according to claim 1, wherein;
the two movable parts rotate about an identical rotary shaft, and
the at least part of the stator core is formed by stacking the thin sheets in a rotation direction of the two movable parts and is retained with tensile stress applied thereto in an axial direction of the rotary shaft.

3. The electromagnetic device according to claim 2, wherein;
the thin sheets are thin sheets rolled in a radial direction of the rotary shaft.

4. The electromagnetic device according to claim 2, wherein;
the thin sheets have parts of which sectional areas in the axial direction of the rotary shaft are smaller than those of other parts thereof.

5. The electromagnetic device according to claim 2, the electromagnetic device being a rotary electric machine, wherein:
the two movable parts are a first rotor and a second rotor, and
the rotary electric machine includes a stator formed by winding a coil around the stator core.

6. The electromagnetic device according to claim 5, wherein;
each thin sheet has two side portions along the axial direction, and
at least one of the two side portions is opposed to the first rotor or the second rotor which is an opposed movable part, and is bent toward a rotation-direction lagged side of the movable part.

7. The electromagnetic device according to claim 5, wherein;
the rotation directions or rotation speeds of the two movable parts are different from each other.

8. The electromagnetic device according to claim 5, wherein:
the first rotor includes a boss portion press-fitted and fixed to the rotary shaft, and a first magnet adhered and fixed to a radially outer side of the boss portion,
the second rotor includes an outer shaft fixed to the rotary shaft, and a second magnet adhered and fixed to a radially inner side of the outer shaft,
the stator core has a body portion opposed to the first magnet and the second magnet, and has, at both ends of the body portion, distal end portions which protrude from the body portion in the axial direction of the rotary shaft and of which sectional areas in the axial direction are smaller than that of the body portion,
the distal end portion at one end is attached to a non-load-side base rotatably retaining the first rotor and the second rotor, and
the distal end portion at another end is attached, with the stator core pulled, to a load-side base rotatably retaining the first rotor and the second rotor.

9. The electromagnetic device according to claim 5, wherein;
the first rotor includes a boss portion press-fitted and fixed to the rotary shaft, and a first magnet adhered and fixed to a radially outer side of the boss portion,
the second rotor includes an outer shaft fixed to the rotary shaft, and a second magnet adhered and fixed to a radially inner side of the outer shaft,
the stator core has a body portion opposed to the first magnet and the second magnet, and has, at each of both ends of the body portion, two distal end portions which protrude from the body portion in the axial direction of the rotary shaft and which extend respectively from both sides of the body portion that are opposed to the first magnet and the second magnet,
the two distal end portions at one end are attached to a non-load-side base rotatably retaining the first rotor and the second rotor, and
the distal end portions at another end are attached, with the stator core pulled, to a load-side base rotatably retaining the first rotor and the second rotor.

10. The electromagnetic device according to claim 9, wherein:
the stator core has two side portions extending in the axial direction of the rotary shaft and respectively opposed to the first magnet and the second magnet, and a retention portion retaining the side portions between the first magnet and the second magnet,
the side portions are each formed by stacking thin sheets in the movable direction of the first rotor and the second rotor,
the retention portion is formed by stacking, in the axial direction, thin sheets having cutouts on a side opposed to the first magnet and a side opposed to the second magnet, the two side portions being retained by the cutouts of the retention portion,
the two side portions each have the distal end portions extending from the retention portion toward both sides in the axial direction of the rotary shaft,
the two distal end portions at the one end are attached to the non-load-side base rotatably retaining the first rotor and the second rotor, and
the distal end portions at the other end are attached, with the stator core pulled, to the load-side base rotatably retaining the first rotor and the second rotor.

11. The electromagnetic device according to claim 5, wherein;
the first rotor includes a boss portion press-fitted and fixed to the rotary shaft, and a first magnet adhered and fixed to a radially outer side of the boss portion,
the second rotor includes an outer shaft, and a second magnet adhered and fixed to a radially inner side of the outer shaft,
the stator core has a body portion opposed to the first magnet and the second magnet, and has, at both ends of the body portion, distal end portions which protrude from the body portion in the axial direction of the rotary shaft and of which sectional areas in the axial direction are smaller than that of the body portion,
the distal end portion at one end is attached to a non-load-side base rotatably retaining the first rotor and the second rotor, and
the distal end portion at another end is attached, with the stator core pulled, to a load-side base rotatably retaining the first rotor and the second rotor.

12. The electromagnetic device according to claim 5, wherein:
the first rotor includes a non-load-side boss portion press-fitted and fixed to the rotary shaft, and a first magnet adhered and fixed to an axial-direction load side of the non-load-side boss portion,
the second rotor includes a load-side boss portion fixed to the rotary shaft, and a second magnet adhered and fixed to an axial-direction non-load side of the load-side boss portion,
the stator core has a body portion opposed to the first magnet and the second magnet, and has, at each of both ends of the body portion, two distal end portions which protrude from the body portion in a radial direction of the rotary shaft and which extend respectively from both sides of the body portion that are opposed to the first magnet and the second magnet,
the two distal end portions at one end are attached to a radially-inner-side retention member rotatably retaining the first rotor and the second rotor, and
the distal end portions at another end are attached, with the stator core pulled, to a radially-outer-side retention member surrounding the first rotor and the second rotor.

13. The electromagnetic device according to claim 2, the electromagnetic device being a magnetic gear, wherein:
the two movable parts are a first rotor and a second rotor, and
the stator core forms a pole piece between the first rotor and the second rotor.

14. The electromagnetic device according to claim 13, wherein:
the rotation directions or numbers of poles of the two movable parts are different from each other.

15. The electromagnetic device according to claim 13, wherein:
the first rotor includes a boss portion press-fitted and fixed to the rotary shaft, and a first magnet adhered and fixed to a radially outer side of the boss portion,
the second rotor includes an outer shaft, and a second magnet adhered and fixed to a radially inner side of the outer shaft,
the stator core has a body portion opposed to the first magnet and the second magnet, and has, at both ends of the body portion, distal end portions which protrude from the body portion in the axial direction of the rotary shaft and of which sectional areas in the axial direction are smaller than that of the body portion, the distal end portion at one end is attached to a non-load-side base rotatably retaining the first rotor and the second rotor, and the distal end portion at another end is attached, with the stator core pulled, to a load-side base rotatably retaining the first rotor and the second rotor.

16. The electromagnetic device according to claim 1, the electromagnetic device being a linear motor, wherein:

the linear motor includes a stator formed by winding a coil around the stator core, and the two movable parts are movable by a linear guide.

17. The electromagnetic device according to claim 16, wherein:

the stator core is formed by stacking, in the movable direction of the two movable parts, thin sheets rolled in a direction in which the two movable parts are opposed to each other.

18. An aircraft using the electromagnetic device according to claim 5.

19. An aircraft using the electromagnetic device according to claim 13.

* * * * *